(12) United States Patent
Abe et al.

(10) Patent No.: US 7,536,655 B2
(45) Date of Patent: May 19, 2009

(54) THREE-DIMENSIONAL-MODEL PROCESSING APPARATUS, THREE-DIMENSIONAL-MODEL PROCESSING METHOD, AND COMPUTER PROGRAM

(75) Inventors: Yuichi Abe, Tokyo (JP); Hiroyuki Segawa, Kanagawa (JP); Akio Yoshioka, Saitama (JP)

(73) Assignee: Sony Corporation, Tokyo (JP)

( * ) Notice: Subject to any disclaimer, the term of this patent is extended or adjusted under 35 U.S.C. 154(b) by 687 days.

(21) Appl. No.: 10/885,357

(22) Filed: Jul. 6, 2004

(65) Prior Publication Data

US 2005/0024360 A1 Feb. 3, 2005

(30) Foreign Application Priority Data

Jul. 18, 2003 (JP) .......................... P2003-276400

(51) Int. Cl.
*G06F 3/048* (2006.01)

(52) U.S. Cl. ...................... 715/848; 715/757; 715/850; 715/852; 715/849; 715/851; 345/419; 345/653; 345/664; 345/679

(58) Field of Classification Search ................. 715/757, 715/848, 850, 852, 849, 851; 345/419, 653, 345/664, 679
See application file for complete search history.

(56) References Cited

U.S. PATENT DOCUMENTS 6,720,949 B1 * 4/2004 Pryor et al. ................. 345/158

FOREIGN PATENT DOCUMENTS

| EP | 1211647 A1 * | 6/2002 |
|---|---|---|
| JP | 7-49745 | 2/1995 |
| JP | 8-212381 | 8/1996 |
| JP | 2000-99767 | 4/2000 |
| JP | 2001-32561 | 11/2001 |
| JP | 2001-307134 | 11/2001 |
| JP | 2001-325611 | * 11/2001 |

* cited by examiner

*Primary Examiner*—Weilun Lo
*Assistant Examiner*—Rashedul Hassan
(74) *Attorney, Agent, or Firm*—K & L Gates LLP

(57) ABSTRACT

Three-dimensional-model processing apparatus, three-dimensional-model processing methods, and computer programs are provided. In a three-dimensional-model processing apparatus, method, and computer programs, it is determined whether relative positions or relative attitudes of a plurality of three-dimensional objects shown on an image display unit satisfy a predetermined processing execution condition. When it is determined that the processing execution condition is satisfied, distinction information indicating that processing such as pickup or joining of objects is possible is presented. For example, display mode is changed or sound is output for the objects. A user is allowed to immediately find without stress whether an object is at a position where pickup or joining is possible. This improves the efficiency of operation.

21 Claims, 20 Drawing Sheets

FIG. 3

| PROCESSING EXECUTION CONDITION | PROCESSING MODE |
|---|---|
| DISTANCE $d \leq$ THRESHOLD DISTANCE D<br>DISTANCE BETWEEN OBJECTS | a. CHANGE DISPLAY MODE (COLOR, SHAPE, BORDER, ETC.) OF OBJECT SATISFYING THE CONDITION<br>b. OUTPUT SOUND<br>c. ... |
| RELATIVE ATTITUDES OF OBJECTS ARE PARALLEL | a. CHANGE DISPLAY MODE (COLOR, SHAPE, BORDER, ETC.) OF OBJECT SATISFYING THE CONDITION<br>b. OUTPUT SOUND<br>c. ... |
| ... | ... |

FIG. 6A
FIG. 6B
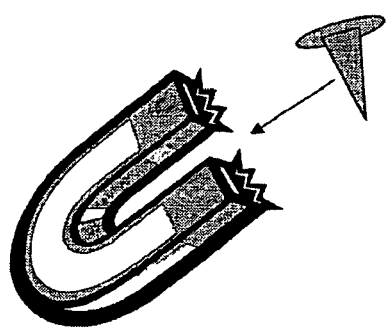
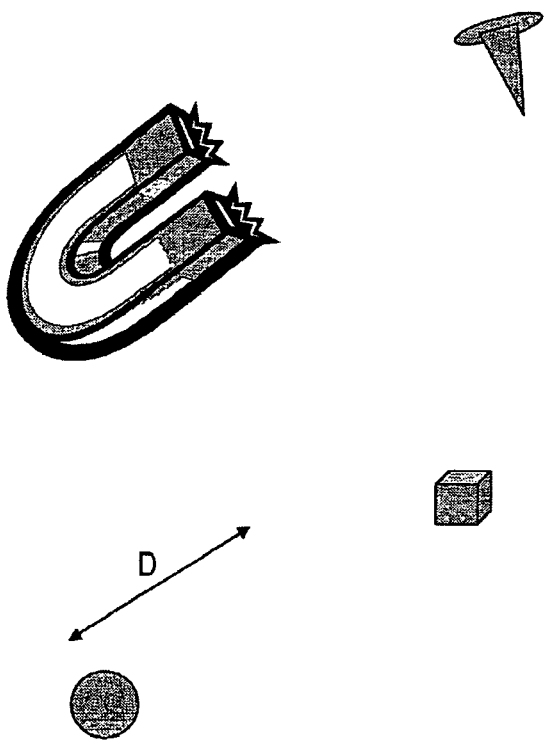

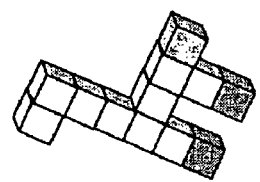
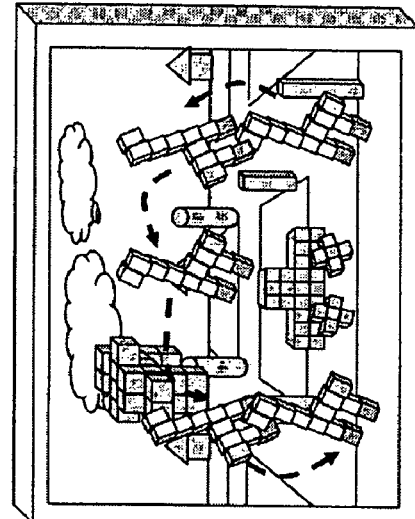
FIG. 11A
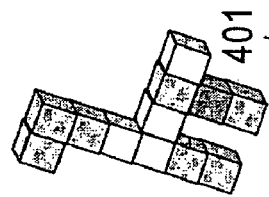
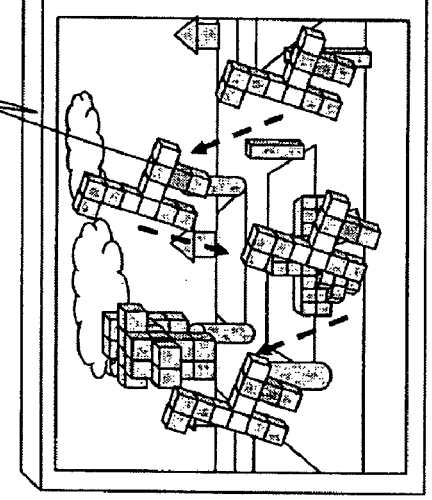
FIG. 11B
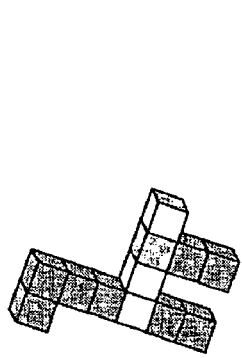
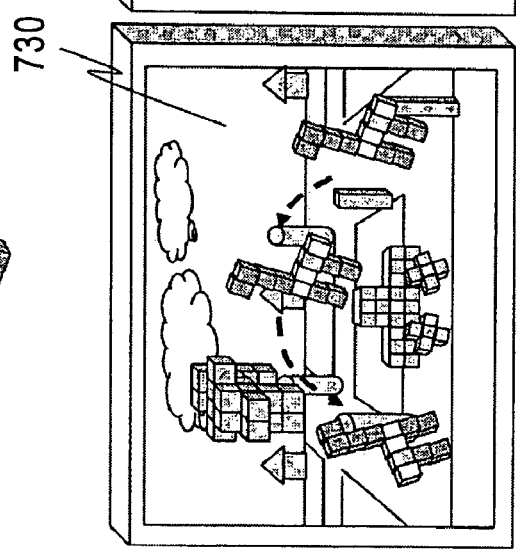
FIG. 11C

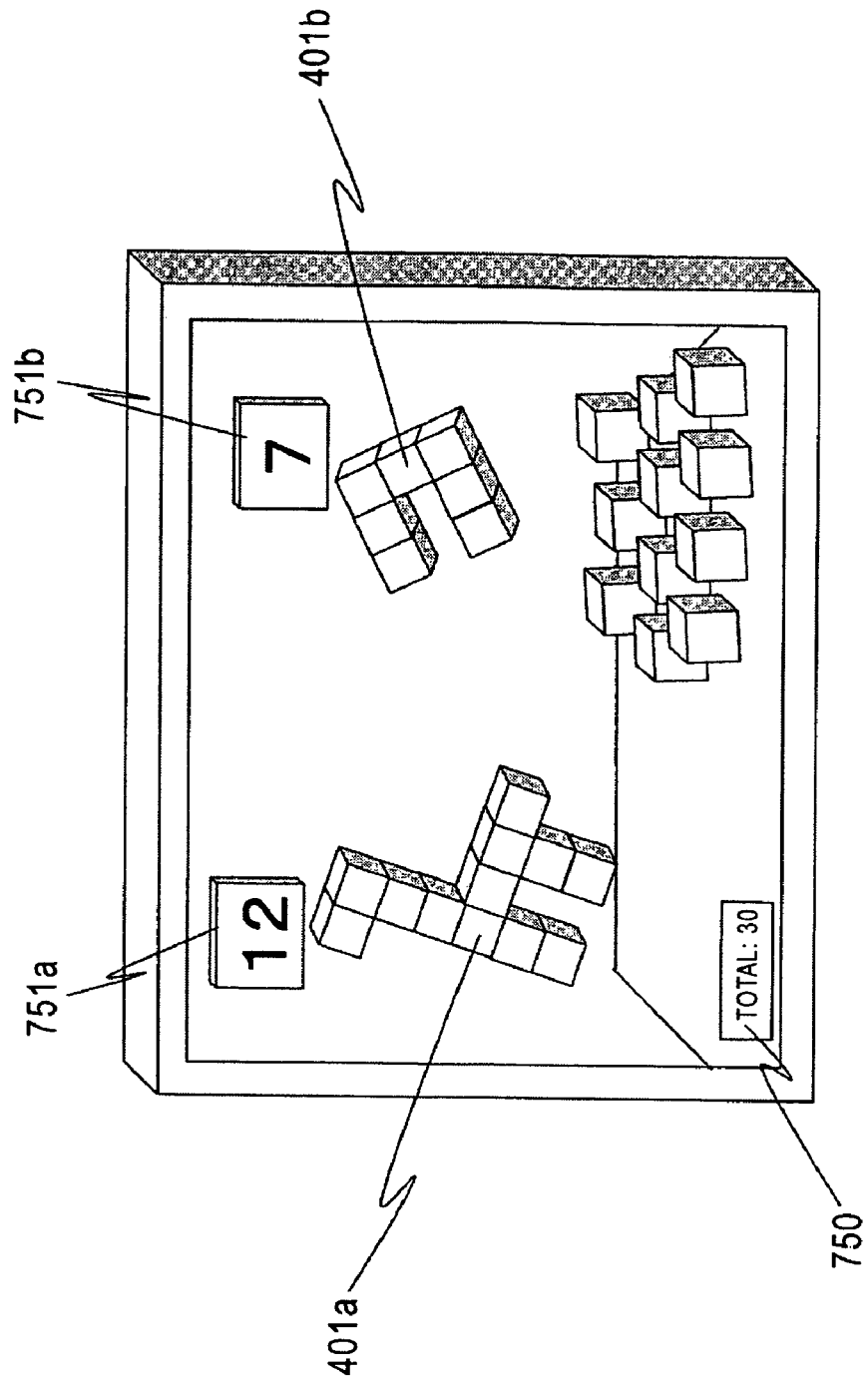

FIG. 15
(a)
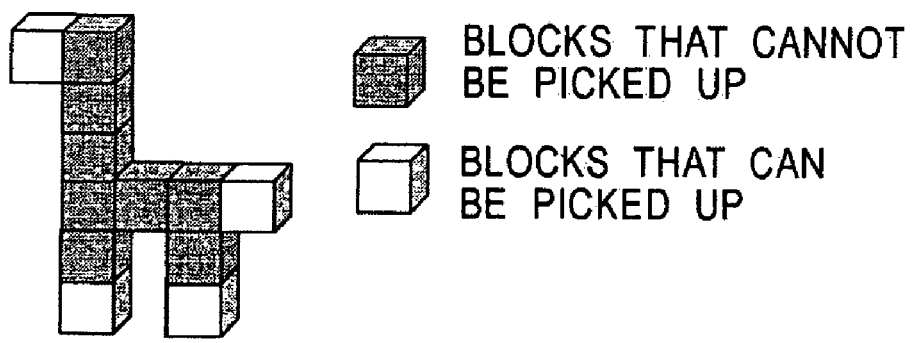
BLOCKS THAT CANNOT BE PICKED UP
BLOCKS THAT CAN BE PICKED UP
(b)
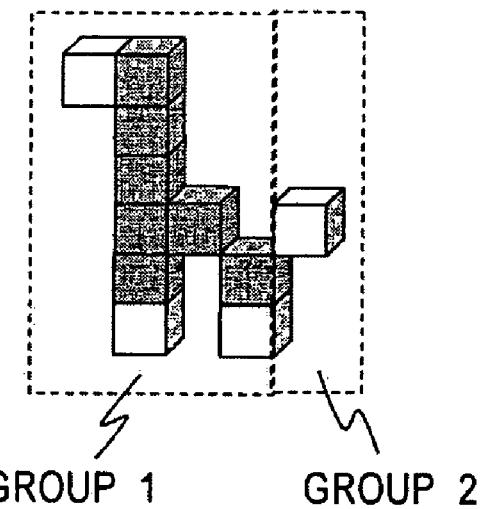
GROUP 1   GROUP 2
DIVIDED INTO GROUPS
(c)
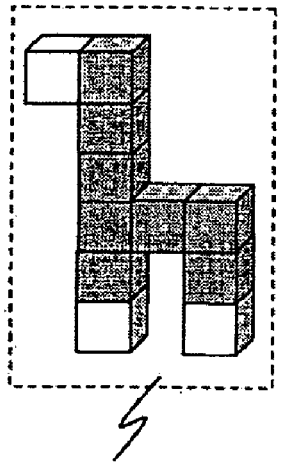
GROUP 1
SINGLE GROUP 1501  1501

1502

1501  1501

1503

THREE-DIMENSIONAL-MODEL PROCESSING APPARATUS, THREE-DIMENSIONAL-MODEL PROCESSING METHOD, AND COMPUTER PROGRAM

CROSS REFERENCES TO RELATED APPLICATIONS

This application claims priority to Japanese Patent Application No. P2003-276400 filed on Jul. 18, 2003, the disclosure of which is incorporated by reference herein.

BACKGROUND OF THE INVENTION

The present invention relates to three-dimensional-model processing apparatuses, three-dimensional-model processing methods, and computer programs. More specifically, the present invention relates to a three-dimensional-model processing apparatus, a three-dimensional-model processing method, and a computer program for displaying three-dimensional objects on a display of a personal computer or the like, and executing various processing such as moving the three-dimensional objects or changing the shapes of the three-dimensional objects in accordance with user's operations, with which ease of user's operations is improved by presenting type of processing that can be executed or expected processing result based on, for example, spatial relationship among the three-dimensional objects on the display.

Systems that display three-dimensional images on displays and that allow users to manipulate the three-dimensional images on the displays are used in various information processing apparatuses such as game machines, computers, computer-aided design (CAD) machines, or computer graphics (CG) processing apparatuses.

When executing various operations on various objects (three-dimensional objects) included in a three-dimensional image shown on a display, such as movement, rotation, joining, or detachment of objects, ordinary existing software such as CG software or three-dimensional CAD software specifies a three-dimensional object to be processed using an input device such as a mouse, a keyboard, or a two-dimensional tablet.

In conventional apparatuses, devices that allow input of information specifying a two-dimensional or one-dimensional position, such as a mouse, a keyboard, or a two-dimensional tablet, have been used to specify objects. Thus, when specifying a three-dimensional object on a display, a user specifies a position of the three-dimensional object in the form of two-dimensional or one-dimensional information. After specifying an object, the user executes various processing on the object, such as pickup, movement, rotation, or joining with another three-dimensional model.

However, a mouse, a keyboard, a two-dimensional tablet, or the like, is a device for inputting two-dimensional or one-dimensional information, so that operation based on a three-dimensional space shown on a display is difficult. Thus, objects must be processed based on user input under restrictions; for example, the direction of movement of three-dimensional objects is limited within a plane, or the axis of rotation is fixed.

Under such restrictions, for example, when an object is moved while rotating it, a plurality of operations must be repeated. For example, the object is first moved in a restricted plane, the object is then rotated about a fixed axis, and the procedure is repeated. These operations cause the user to feel a sense of unnaturalness in comparison with operations in the real world.

As an approach for overcoming the problem described above, a three-dimensional-model processing apparatus having an input device that allows input of three-dimensional position and attitude information is disclosed, for example, in Japanese Unexamined Patent Application Publication No. 2001-307134. According to the art disclosed, processing on three-dimensional objects shown on a display, such as changing shape or coloring surface, is executed using the three-dimensional position and attitude input device.

Various implementations of such a three-dimensional position and attitude input device, including a magnetic implementation based on a magnetic sensor.

The magnetically implemented input device has an operation object that includes a coil and that can be moved freely in a three-dimensional space by a user's hand. The operation object is moved in a magnetic space defined by a magnetic field generated by a magnetic-field generator, and a current induced on the coil is measured, and position and attitude of the operating device is measured and the information obtained is input as three-dimensional information.

Various other implementations of such a three-dimensional position and attitude measuring device have been proposed, including an ultrasonic implementation, a mechanical implementation, and an optical implementation. In the ultrasonic implementation, an operation object includes an ultrasonic transmitter, and three-dimensional measurement is carried out based on acoustic pressure or arrival time of ultrasonic wave received by the operation object. In the mechanical implementation, an operation object is connected to a mechanically movable member such as a multi-joint arm, and three-dimensional position information of the operation object is determined based on the motion thereof. In the optical implementation, three or more markers are provided on an operation object, the markers on the operation object are imaged by a camera, and three-dimensional information of the operation object is obtained based on the captured image.

By using such a three-dimensional position and attitude measurement system, input of three-dimensional information associated with a three-dimensional space shown on a display is allowed. Thus, a user is allowed to perform processing on three-dimensional objects on the display without feeling a sense of unnaturalness in comparison with operations in the real world.

However, even with such a three-dimensional-information inputting device, the display itself is a two-dimensional plane. Thus, a user still has difficulty in recognition of an image on the display with respect to the depth direction. More specifically, for example, operations for butting or joining a plurality of three-dimensional objects on the display with each other are difficult.

More specifically, when a plurality of three-dimensional objects on the display is butted or joined with each other, the plurality of three-dimensional objects must be defined at the same coordinate position in an XYZ space. Assuming that the display plane is the XY plane, it is easy for the user to move a plurality of objects at the same position on the XY plane while watching the objects on the display. However, it is difficult for the user to match the positions of the objects with respect to the depth direction (Z direction) while watching the objects on the display. For example, when two objects a and b exist, it is not easy to recognize from the screen that the object a is in front of the object b.

Furthermore, when a plurality of objects is joined to form a combined object, the objects must be observed from various angles to determine parts to be joined. A conventional three-dimensional-information input device only allows manipulation of a single object. After a single object is manipulated by the three-dimensional-information input device to join it with another object, when the joined objects as viewed from a different direction are displayed, the view often differs from an expected view. In order to join objects as desired, complex and laborious processing is needed, such as alternately manipulating the object to be operated and the object to be joined and changing viewpoint to check the result of joining.

Furthermore, although a method of simultaneously displaying images as viewed from different directions and manipulating objects while referring to the images simultaneously, it requires sophisticated skills to manipulate objects while referring to a plurality of images simultaneously.

Furthermore, according to the art disclosed in Japanese Unexamined Patent Application Publication No. 2001-307134, a target object on which some processing is to be executed and an editing object for executing processing on the target object are simultaneously operated with both hands. Thus, intuitive operations are allowed, such as tilting the target object at an angle desired by the user and performing operations by the editing object. However, since both hands are used in the space, the operations are affected by hand shake or the like. Furthermore, although flexibility is increased, delicate control is difficult. Furthermore, these factors depend on error of the three-dimensional position and attitude measurement system used, so that the difficulty of operations increases as error becomes larger.

SUMMARY OF THE INVENTION

The present invention relates to three-dimensional-model processing apparatuses, three-dimensional-model processing methods, and computer programs. More specifically, the present invention relates to a three-dimensional-model processing apparatus, a three-dimensional-model processing method, and a computer program for displaying three-dimensional objects on a display of a personal computer or the like, and executing various processing such as moving the three-dimensional objects or changing the shapes of the three-dimensional objects in accordance with user's operations, with which ease of user's operations is improved by presenting type of processing that can be executed or expected processing result based on, for example, spatial relationship among the three-dimensional objects on the display.

The present invention provides in an embodiment a three-dimensional-model processing apparatus, a three-dimensional-model processing method, and a computer program for presenting type of processing that can be executed or expected result of processing based on a spatial relationship of a plurality of three-dimensional models so that processing can be executed without stress even when a three-dimensional position and attitude measuring device that does not readily allow delicate control of movement is used.

The present invention, in an embodiment thereof, provides a three-dimensional-model processing apparatus for displaying three-dimensional objects on a display and for executing processing relating to the displayed objects based on information input from input device, the three-dimensional-model processing apparatus including a three-dimensional information measuring unit for measuring three-dimensional information of operating devices; a display-information controlling unit for controlling display of three-dimensional objects associated with the operating devices, based on the three-dimensional information of the operating devices, input from the three-dimensional-information measuring unit; and an image display unit for displaying an image including the three-dimensional objects associated with the operating devices, under control of the display-information controlling unit; wherein the display-information controlling unit determines whether relative positions or relative attitudes of a plurality of three-dimensional objects satisfy a predetermined processing execution condition, and executes processing for presenting distinction information to indicate that processing can be executed when it is determined that the processing execution condition is satisfied.

The processing execution condition may be a condition that is set based on a three-dimensional distance, in a virtual space, between the plurality of three-dimensional objects displayed on the image display unit.

Alternatively, the processing execution condition may be a condition that is set based on relative tilts defining attitudes of the plurality of three-dimensional objects displayed on the image display unit.

Alternatively, the display-information controlling unit may dynamically change the processing execution condition based on precision or resolution of measurement of three-dimensional information in the three-dimensional-information measuring unit.

The display-information controlling unit, as the processing for presenting distinction information, may execute processing for changing display mode so that a three-dimensional object satisfying the processing execution condition or a three-dimensional object integrated with a three-dimensional object satisfying the processing execution condition can be distinguished from other objects.

For example, the processing for changing display mode changes at least one attribute among color, size, shape, and motion, of at least one element among surface, line, and vertex of the three-dimensional object.

Alternatively, the display-information controlling unit, as the processing for presenting distinction information, may execute processing for outputting sound so that a three-dimensional object satisfying the processing execution condition or a three-dimensional object integrated with a three-dimensional object satisfying the processing execution condition can be distinguished from other objects.

The processing execution condition is, for example, a condition for executing processing for picking up an object, and wherein the display-information controlling unit determines whether relative positions or relative attitudes of a plurality of three-dimensional objects displayed on the image display unit satisfy a predetermined condition for executing the processing for pickup, and executes the processing for presenting distinction information to indicate that the processing for pickup can be executed when it is determined that the condition for executing the processing for pickup is satisfied.

The processing execution condition is, for example, a condition for executing processing for joining an object, and wherein the display-information controlling unit determines whether relative positions or relative attitudes of a plurality of three-dimensional objects displayed on the image display unit satisfy a predetermined condition for executing the processing for joining, and executes the processing for presenting distinction information to indicate that the processing for joining can be executed when it is determined that the condition for executing the processing for joining is satisfied.

The display-information controlling unit, as the processing for presenting distinction information to indicate that the processing for joining objects can be executed, may execute processing for displaying a virtual joining region showing a state after joining.

The display-information controlling unit may generate a new object and display the new object on the image display unit based on input information indicating that one of the operating devices is located in proximity to a position of a real object, the position being set in the three-dimensional-information measuring unit.

Based on input information indicating that one of the operating devices is located in proximity to a position of a real object for network connection, the position being set in the three-dimensional-information measuring unit, processing for communication may be executed to send information of an object displayed on the image display unit, the object being associated with the one operating device, to an external apparatus connected via a network, and to display the object in a three-dimensional image provided by the external apparatus.

Furthermore, processing for communication may be executed to send a program or program-specifying information defining operation of the object associated with the one operating device together with the object information to the external apparatus connected via the network, the operation being set in accordance with composition information of the object, and to display the object in the three-dimensional image provided by the external apparatus so that the object operates in accordance with the composition information of the object.

The present invention, in another embodiment thereof, provides a three-dimensional-model processing method for displaying three-dimensional objects on a display and for executing processing relating to the displayed objects based on information input from input device, the three-dimensional-model processing method including a three-dimensional information measuring step of measuring three-dimensional information of operating devices; a display-information controlling step of controlling display, on an image display unit, of three-dimensional objects associated with the operating devices, based on the three-dimensional information of the operating devices, measured in the three-dimensional-information measuring step; and an image display step of displaying, on the image display unit, an image including the three-dimensional objects associated with the operating devices, under control in the display-information controlling step; wherein the display-information controlling step includes a step of determining whether relative positions or relative attitudes of a plurality of three-dimensional objects satisfy a predetermined processing execution condition, and executing processing for presenting distinction information to indicate that processing can be executed when it is determined that the processing execution condition is satisfied.

The processing execution condition may be a condition that is set based on a three-dimensional distance, in a virtual space, between the plurality of three-dimensional objects displayed on the image display unit.

Alternatively, the processing execution condition may be a condition that is set based on relative tilts defining attitudes of the plurality of three-dimensional objects displayed on the image display unit.

Alternatively, the display-information controlling step may include a step of dynamically changing the processing execution condition based on precision or resolution of measurement of three-dimensional information in the three-dimensional-information measuring step.

The display-information controlling step may include, as the processing for presenting distinction information, a step of executing processing for changing display mode so that a three-dimensional object satisfying the processing execution condition or a three-dimensional object integrated with a three-dimensional object satisfying the processing execution condition can be distinguished from other objects.

For example, the processing for changing display mode changes at least one attribute among color, size, shape, and motion, of at least one element among surface, line, and vertex of the three-dimensional objects.

Alternatively, the display-information controlling step may includes, as the processing for presenting distinction information, a step of executing processing for outputting sound so that a three-dimensional object satisfying the processing execution condition or a three-dimensional object integrated with a three-dimensional object satisfying the processing execution condition can be distinguished from other objects.

The processing execution condition is, for example, a condition for executing processing for picking up an object, and wherein the display-information controlling step includes a step of determining whether relative positions or relative attitudes of a plurality of three-dimensional objects displayed on the image display unit satisfy a predetermined condition for executing the processing for pickup, and executing the processing for presenting distinction information to indicate that the processing for pickup can be executed when it is determined that the condition for executing the processing for pickup is satisfied.

The processing execution condition is, for example, a condition for executing processing for joining objects, and wherein the display-information controlling step includes a step of determining whether relative positions or relative attitudes of a plurality of three-dimensional objects displayed on the image display unit satisfy a predetermined condition for executing the processing for joining, and executing the processing for presenting distinction information to indicate that the processing for joining can be executed when it is determined that the condition for executing the processing for joining is satisfied.

The display-information controlling step may include, as the processing for presenting distinction information to indicate that the processing for joining objects can be executed, a step of executing processing for displaying a virtual joining region showing a state after joining.

The display-information controlling step may include a step of generating a new object and displaying the new object on the image display unit based on input information indicating that one of the operating devices is located in proximity to a position of a real object, the position being set in the three-dimensional-information measuring unit.

Based on input information indicating that one of the operating devices is located in proximity to a position of a real object for network connection, the position being set in the three-dimensional-information measuring unit, processing for communication may be executed to send information of an object displayed on the image display unit, the object being associated with the one operating device, to an external apparatus connected via a network, and to display the object in a three-dimensional image provided by the external apparatus.

Furthermore, processing for communication may be executed to send a program or program-specifying information defining operation of the object associated with the one operating device together with the object information to the external apparatus connected via the network, the operation being set in accordance with composition information of the object, and to display the object in the three-dimensional image provided by the external apparatus so that the object operates in accordance with the composition information of the object.

The present invention, in another embodiment thereof, provides a computer program for displaying three-dimensional objects on a display and for executing processing relating to the displayed objects based on information input from input device, the computer program including a three-dimensional information measuring step of measuring three-dimensional information of operating devices; a display-information controlling step of controlling display, on an image display unit, of three-dimensional objects associated with the operating devices, based on the three-dimensional information of the operating devices, measured in the three-dimensional-information measuring step; and an image display step of displaying, on the image display unit, an image including the three-dimensional objects associated with the operating devices, under control in the display-information controlling step; wherein the display-information controlling step includes a step of determining whether relative positions or relative attitudes of a plurality of three-dimensional objects satisfy a predetermined processing execution condition, and executing processing for presenting distinction information to indicate that processing can be executed when it is determined that the processing execution condition is satisfied.

The computer program according to an embodiment of the present invention can be provided using a storage medium or communication medium for providing the program in a computer-readable form to a computer system that is capable of executing various program code, such as a CD, an FD, an MO, or a network. By providing the computer program in a computer-readable form, processing according to the computer program can be executed on the computer system.

Other features and advantages of the present invention will become apparent from the embodiments of the present invention with reference to the attached drawings. In this specification, a system refers to a logical combination of a plurality of apparatuses, regardless of whether the apparatuses reside within a single case.

According to an embodiment of the present invention, it is determined whether relative positions or relative attitudes of a plurality of objects displayed on an image display unit satisfies a predetermined processing execution condition. When it is determined that the processing execution condition is satisfied, distinction information indicating that processing such as pickup or joining of objects can be executed is presented; for example, display mode is changed or sound is output. Accordingly, a user is allowed to immediately determine whether an object is located at a position where pickup or joining is possible. The present invention allows the user to find the possibility of processing on an object, particularly when it is difficult to precisely grasp distance in a depth direction of a display. Thus, the user is prevented from feeling stress, and the efficiency of operation is improved. The present invention can be applied to various information processing apparatuses such as a computer for graphics processing, a CAD machine, a game machine, or a CG processing apparatus.

Furthermore, according to an embodiment of the present invention, various information can be used as a processing execution condition, such as a three-dimensional distance in a virtual space between a plurality of three-dimensional objects or relative attitudes between objects. Furthermore, the processing execution condition may be changed dynamically based on precision or resolution of three-dimensional measurement in a three-dimensional-information measuring unit. Thus, processing can be executed based on an optimal processing execution condition depending on situations.

Furthermore, according to an embodiment of the present invention, display mode is changed or sound is output so that a three-dimensional object satisfying a processing executing condition or a three-dimensional object integrated with a three-dimensional object satisfying a processing execution condition can be distinguished from other objects. Thus, the user is readily allowed to grasp the possibility of processing on an object. Thus, the user is prevented from feeling stress, and the efficiency of operation is improved.

Furthermore, according to an embodiment of the present invention, generation of an object, and communication of an object via a network are allowed only by processing using an operating device. Thus, various processing can be executed without complex input operations using a keyboard or the like.

Additional features and advantages of the present invention are described in, and will be apparent from, the following Detailed Description of the Invention and the figures.

BRIEF DESCRIPTION OF THE FIGURES

FIG. 3 is a diagram showing an example of a processing-condition setting table stored in a processing-condition storage unit of the display-information controlling unit.

FIGS. 6A and 6B are illustrations showing a comparison between the concept of the building-block application and the concept of a magnet.

FIGS. 11A to 11C are illustrations showing processing for transferring an object to a shared space based on a network connection in the building-block application, and for controlling operation according to the composition of the object.

FIG. 12 is an illustration of an example where the number of blocks constituting an object is displayed in the building-block application.

FIG. 15 is an illustration showing an example of blocks that cannot be picked up.

DETAILED DESCRIPTION OF THE INVENTION

The present invention relates to three-dimensional-model processing apparatuses, three-dimensional-model processing methods, and computer programs. More specifically, the present invention relates to a three-dimensional-model processing apparatus, a three-dimensional-model processing method, and a computer program for displaying three-dimensional objects on a display of a personal computer or the like, and executing various processing such as moving the three-dimensional objects or changing the shapes of the three-dimensional objects in accordance with user's operations, with which ease of user's operations is improved by presenting type of processing that can be executed or expected processing result based on, for example, spatial relationship among the three-dimensional objects on the display.

Now, a three-dimensional model processing apparatus, a three-dimensional-model processing method, and a computer program according to an embodiment of the present invention will be described. The description will first be directed to the overall scheme of the embodiment, and then to specific aspects of the embodiment.

Figure 1:
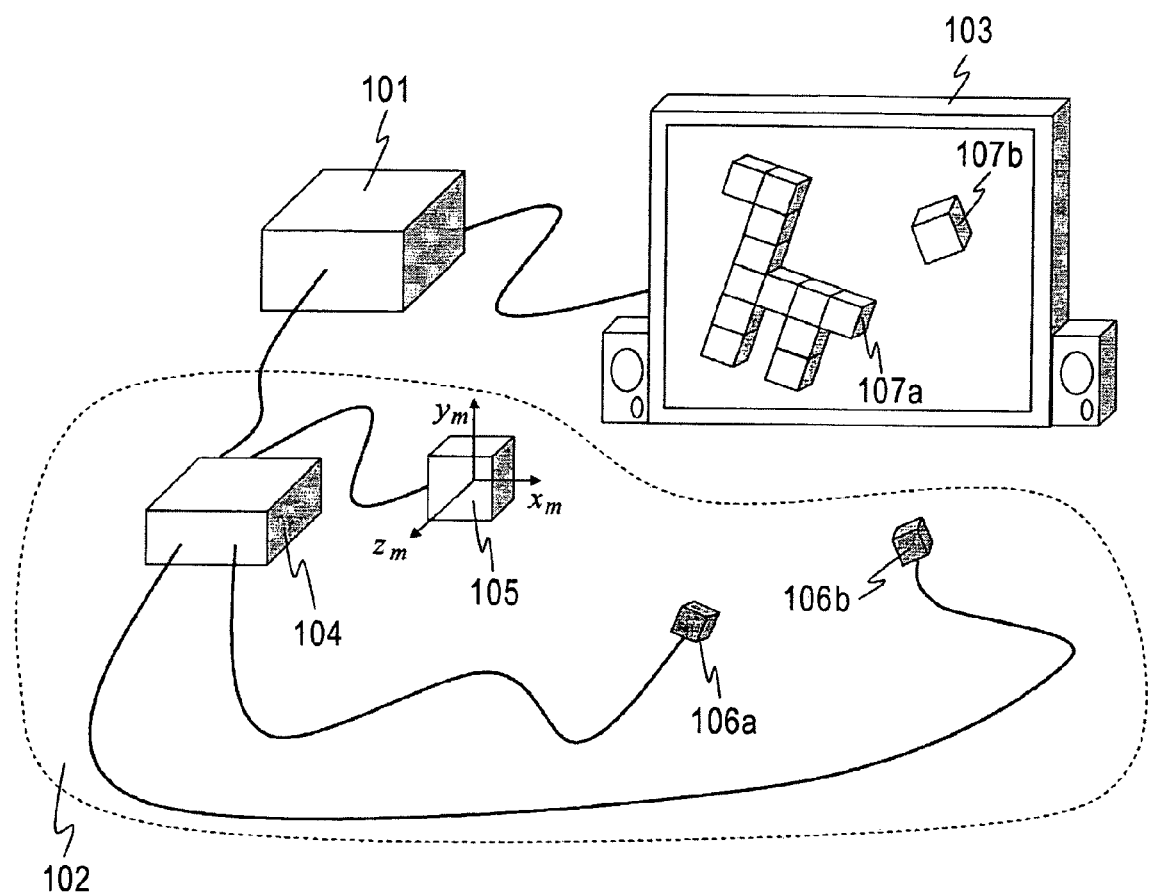
FIG. 1 is a schematic illustration showing the configuration of a three-dimensional-model processing apparatus according to an embodiment of the present invention.

FIG. 1 schematically shows the configuration of a three-dimensional-model processing apparatus according to an embodiment of the present invention. Referring to FIG. 1, the three-dimensional-model processing apparatus includes a display-information controlling unit 101, a three-dimensional-information measuring unit 102, and an image display unit 103.

The three-dimensional-information measuring unit 102 includes a plurality of operating devices 106a and 106b that can be manipulated by user's hands and that can be moved freely in a three-dimensional space, a magnetic-field generator 105, and a three-dimensional-information calculator 104.

The three-dimensional-information measuring unit 102 in this embodiment is implemented using a magnetic sensor. Three-dimensional information herein refers to three-dimensional position and attitude information.

The operating devices 106a and 106b, which can be manipulated by user's hands and moved freely in a three-dimensional space, include coils. When the operating devices 106a and 106b are moved in a magnetic-field space defined by a magnetic field generated by the magnetic-field generator 105, currents are generated on the coils. The currents are measured by the three-dimensional-information calculator 104 to calculate respective three-dimensional information of the operating devices 106a and 106b, including three-dimensional positions and attitudes. For example, respective three-dimensional positions and attitudes of the operating devices 106a and 106b in a coordinate system (Xm, Ym, Zm) centered at the magnetic-field generator 105 are calculated.

The three-dimensional information of the operating devices 106a and 106b, including their respective three-dimensional positions and attitudes, calculated by the three-dimensional-information calculator 104, is input to the display-information controlling unit 101. In the display-information controlling unit 101, display information is generated based on the input information, i.e., processing for controlling three dimensional models is executed. The results of the processing are output to the image display unit 103, where three-dimensional objects 107a and 107b corresponding to the three-dimensional information of the operating devices 106a and 106b, such as their respective positions and attitudes, are displayed.

In this regard, the user is allowed to manipulate the three-dimensional objects 107a and 107b on the image display unit 103 by simultaneously operating the operating devices 106a and 106b with both hands.

As described above, by using a plurality of operating devices that allows input of three-dimensional information, processing of three-dimensional models, such as playing with building blocks in a three-dimensional space on a display, can be achieved in a manner similar to actually playing with building blocks.

Although the three-dimensional-information measuring unit 102 in the embodiment shown in FIG. 1 is magnetically implemented, a three-dimensional-information measuring unit that is ultrasonically implemented, mechanically implemented, optically implemented, or the like, may be used. Also, a combination of these implementations is possible. Furthermore, although the components are connected with each other by cables and data is transferred through the cables in the embodiment shown in FIG. 1, data may be transferred by wireless among the components, in which case the cables connecting the components with each other are not needed.

Figure 2:
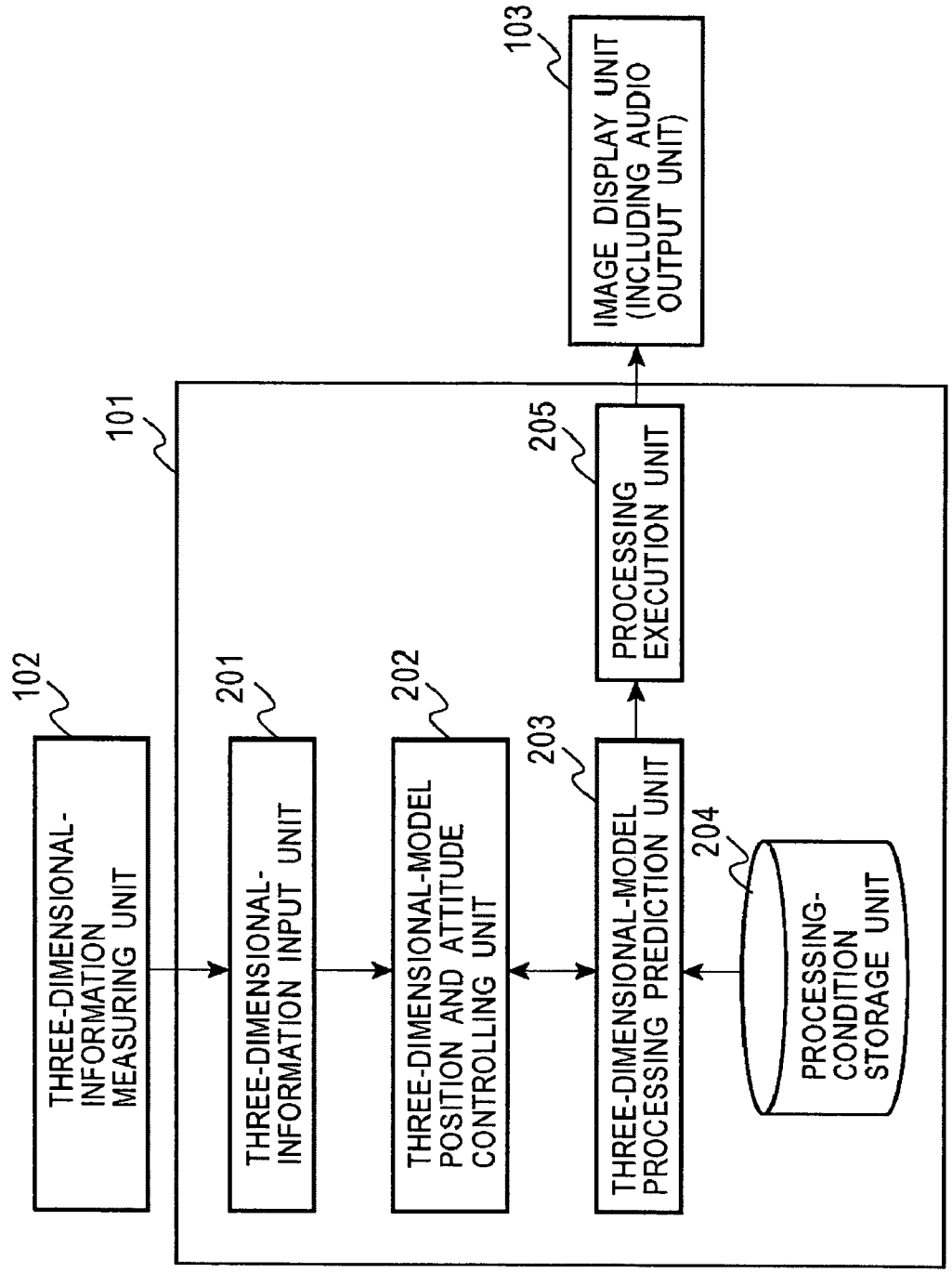
FIG. 2 is a block diagram of a display-information controlling unit in the three-dimensional-model processing apparatus according to an embodiment of the present invention.

FIG. 2 is a block diagram showing a detailed configuration of the display-information controlling unit 101. Referring to FIG. 2, a three-dimensional-information input unit 201 receives input of respective three-dimensional information of the operating devices 106a and 106b, calculated by the three-dimensional-information measuring unit 102.

A three-dimensional-model position and attitude controlling unit 202 updates the positions and attitudes of the objects displayed on the image display unit 103, such as, the objects 107a and 107b associated with the operating devices 106a and 106b, based on the respective three-dimensional information of the operating devices 106a and 106b, input to the three-dimensional-information input unit 201.

Three-dimensional objects that are displayed may be determined by default, or changed dynamically in the course of operations by the user. Specific processing relating to objects will be described later.

The three-dimensional-model position and attitude controlling unit 202 updates the positions and attitudes of a plurality of objects associated with a plurality of operating devices.

A three-dimensional-model processing prediction unit 203 compares a spatial relationship of three-dimensional models updated by the three-dimensional-model position and attitude controlling unit 202 with a processing execution condition specified in a processing-condition setting table stored in a processing-condition storage unit 204. As shown in FIG. 3, the processing-condition setting table stored in the processing-condition storage unit 204 is a table in which spatial relationships of three-dimensional models, used as processing execution conditions, are associated with processing that is to be executed. The processing execution conditions relate to relative positions of two three-dimensional objects, such as a three-dimensional distance in a three-dimensional virtual space on the image display unit 103, or relative attitudes of two three-dimensional objects, such as the two three-dimensional objects being parallel to each other.

For example, a processing execution condition is that a distance d between two three-dimensional objects is less than or equal to a predetermined threshold distance D, and a processing mode for objects satisfying the processing execution condition, such as changing a display mode or outputting a sound, is specified. As another example, a processing execution condition is that relative attitudes of two three-dimensional objects are parallel to each other, and a processing mode for objects satisfying the processing execution condition, such as changing a display mode or outputting a sound, is specified.

When a spatial relationship of three-dimensional models updated by the three-dimensional-model position and attitude controlling unit 202 satisfies a processing execution condition stored in the processing-condition storage unit 204, a processing executing unit 205 executes processing specified in the processing-condition setting table stored in the processing-condition storage unit 204. That is, the processing executing unit 205, for example, changes a display mode or outputs a sound for the objects satisfying the processing execution condition.

As described above, the three-dimensional-model processing prediction unit 203 determines whether a spatial relationship of three-dimensional models updated by the three-dimensional-model position and attitude controlling unit 202 satisfies a processing execution condition stored in the processing-condition storage unit 204. If the processing execution condition is satisfied, the processing executing unit 205 executes processing for presenting distinction information, i.e., changes a display mode or outputs a sound for the objects. Thus, the user is allowed to determine whether processing such as picking up or joining objects on the display is possible, and to check relative positions of the objects.

The processing for presenting distinction information may be processing for changing display mode or processing for outputting sound so that three-dimensional objects satisfying the processing execution condition or three-dimensional objects integrated with three-dimensional objects satisfying the processing execution condition can be distinguished with other objects. The processing for changing display mode is, for example, processing for changing at least one attribute among color, size, shape, and motion, of at least one element among surface, line, and vertex of three-dimensional objects. Specific examples of processing will be described later.

Figure 4:
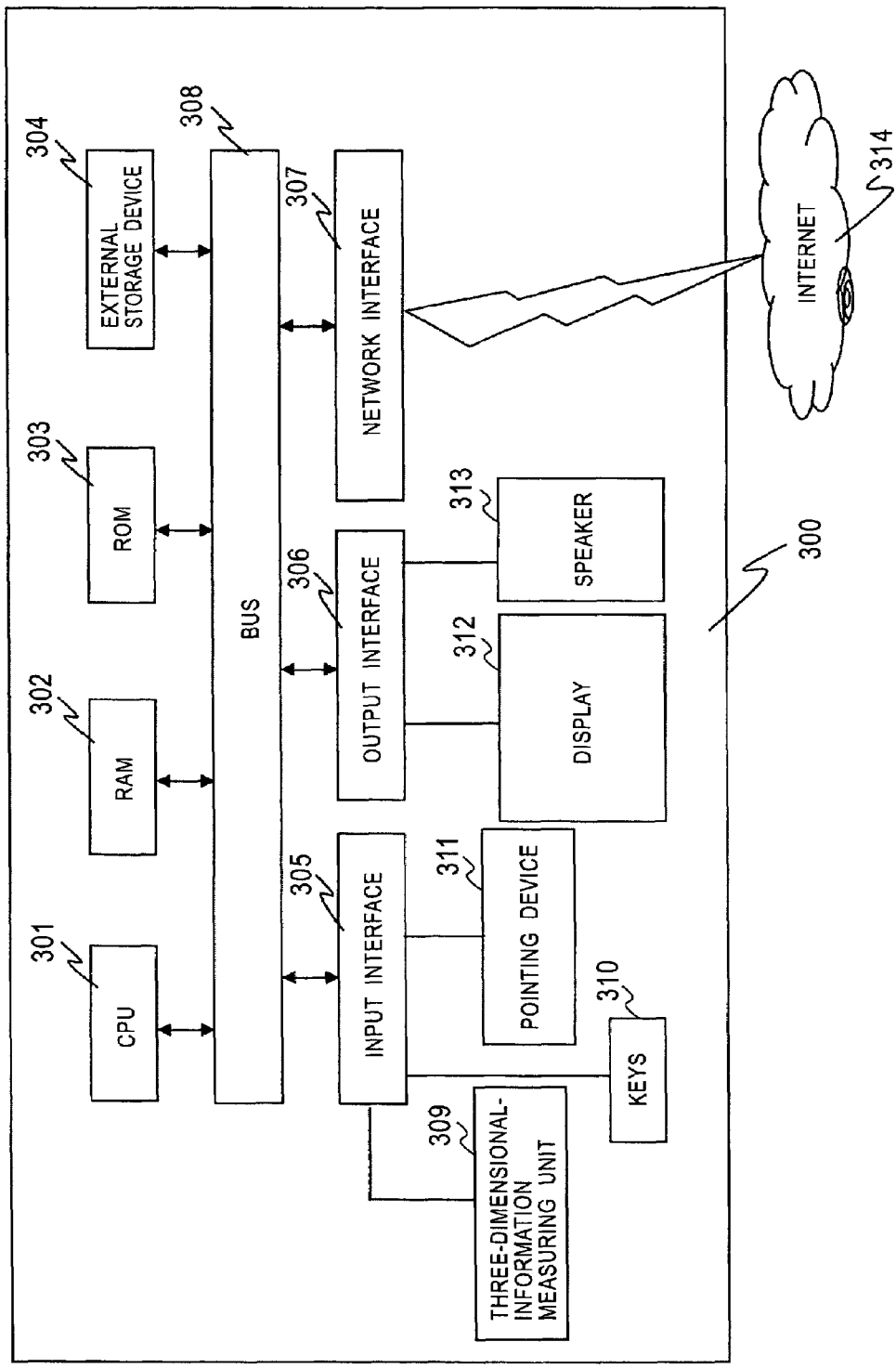
FIG. 4 is a diagram showing an example hardware configuration of the three-dimensional-model processing apparatus according to an embodiment of the present invention.

FIG. 4 shows an example hardware configuration of the three-dimensional-model processing apparatus. A three-dimensional-model processing apparatus 300 includes a central processing unit (CPU) 301, a random access memory (RAM) 302, a read-only memory (ROM) 303, an external storage device 304, an input interface 305, an output interface 306, and a network interface 307. These components are connected to each other via a bus 308.

The CPU 301 is a main controller that controls the entire three-dimensional-model processing apparatus 300. The CPU 301, under the control of an operating system (OS), executes, for example, a building-block application program for assembling a three-dimensional model using cubic blocks.

The RAM 302 is a storage medium that functions as a main memory. The RAM 302 is used as an area for loading program code to be executed by the CPU 301, and as an area for temporarily storing data associated with programs being executed.

The ROM 303 is a semiconductor memory for permanently storing data. On the ROM 303, for example, program code for power on self test (POST) and program code for basic input/output system (BIOS) are written.

The external storage device 304 is a storage medium for storing programs in the form of executable files, and various data. The external storage device 304 may be, for example, a non-volatile semiconductor memory such as a flash memory. Alternatively, the external storage device 304 may be a hard disk, a compact disk (CD), or a digital versatile disk (DVD). Furthermore, the external storage device 304 may also be an external storage device of another system connected via a network. Furthermore, the external storage device 304 may be a combination of devices mentioned above.

The input interface 305 is an interface for connecting various input devices to the three-dimensional-model processing apparatus 300. In this embodiment, a three-dimensional-information measuring unit 309, keys 310, and a pointing device 311 are connected to the three-dimensional-model processing apparatus 300. The three-dimensional-information measuring unit 309 measures three-dimensional position and attitude of an operating device operated by a user. The three-dimensional-information measuring unit 309 is, for example, magnetically implemented, ultrasonically implemented, mechanically implemented, or optically implemented. The keys 310 and the pointing device 311 are input devices for allowing a user to input instructions. When all instructions from the user are input from the three-dimensional-information measuring unit 309, the keys 310 and the pointing device 311 may be omitted.

The output interface 306 is an interface for presenting information to the user. The output interface 306 is connected to a display 312 and a speaker 313. The display 312 is generally an apparatus for visually presenting information input by the user, processing results, errors, and other system messages to the user. The speaker 313 is an apparatus for acoustically presenting various information to the user. Image data or audio data in the form of electronic information are output via the display 312 or the speaker 313.

The network interface 307 is a communication device that allows connecting the system to a local area network (LAN) or a wide area network such as the Internet 314 by wireless communications.

The bus 308 allows transferring data via the modules, the input/output interfaces, and the network interface.

The system configured as described above is cable of executing various processing of three-dimensional models.

PROCESSING EXAMPLES

Next, specific processing in the embodiment and illustrative of the present invention will be described, in the context of an example of a building-block application for assembling three-dimensional models of various shapes using cubic unit blocks.

Application Overview

Figure 5:
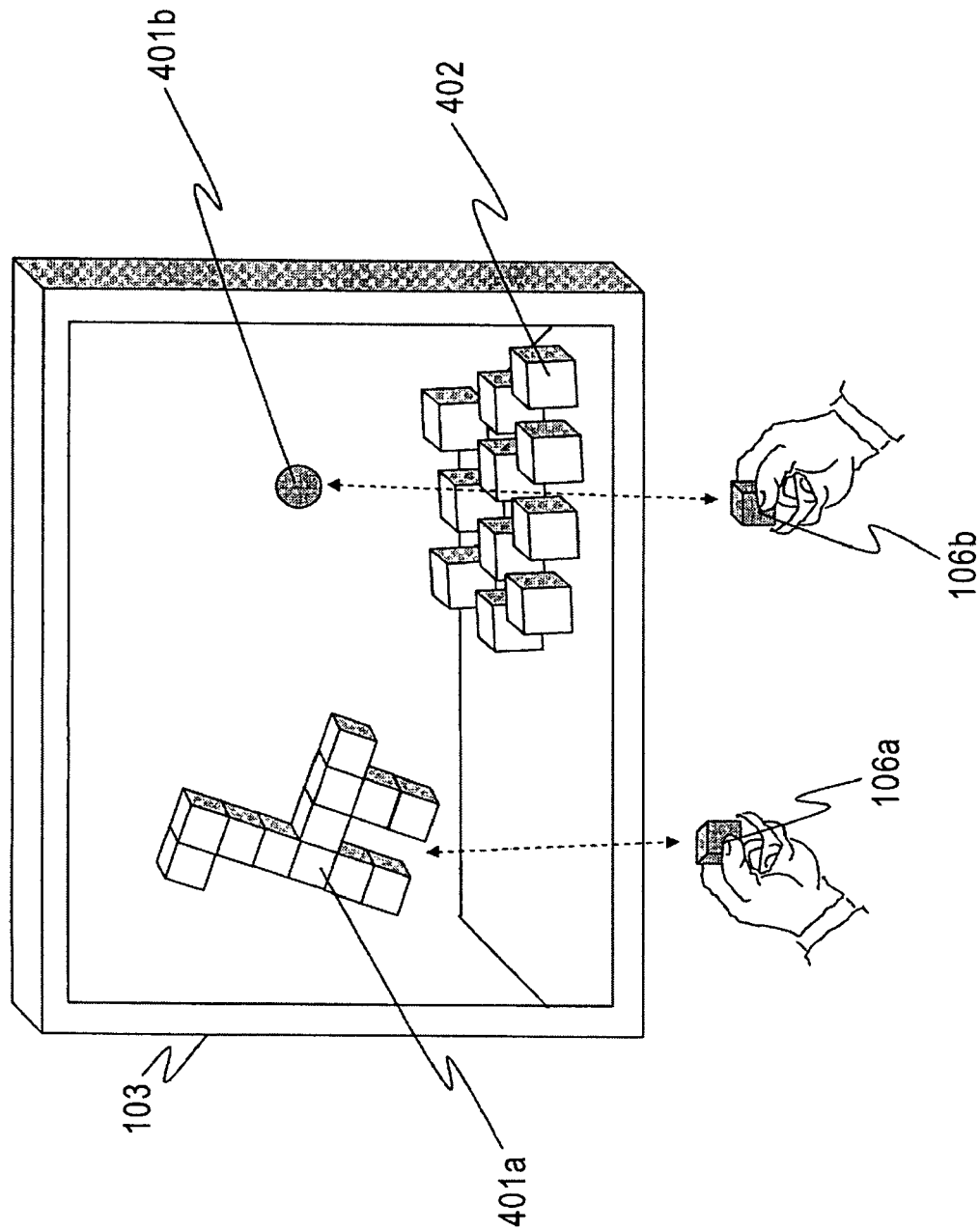
FIG. 5 is an illustration showing an overview of a building-block application for the three-dimensional-model processing apparatus according to an embodiment of the present invention.

First, an overview of the building-block application will be described that is illustrative of the present invention pursuant to an embodiment. FIG. 5 schematically shows the building-block application. Referring to FIG. 5, a user operates the building-block application using the operating devices 106a and 106b as input devices. The operating device 106a and the operating device 106b are associated with an operation object 401a and an operation object 401b displayed on the image display unit 103. When the operating device 106a and the operating device 106b are operated in a three dimensional space, the operation object 401a and the operation object 401b in a virtual three-dimensional space on the image display unit 103 operate according to the movement of the operating device 106a and the operating device 106b.

The user, using the operation object 401b, picks up a block 402 that is left off in a lower region of the virtual three-dimensional space on the display, and joins the block 402 with the other operation object 401a. In this example, the block 402 has a cubic shape, and each surface of the block 402 can be joined with any surface of other blocks 402. By repeating the operation described above, an object of desired shape can be created by combining cubic blocks 402.

Furthermore, it is possible to again pick up a block 402 that has once been joined. That is, instead of picking up an unpicked block 402 using the operation object 401b, it is possible to pick up a cubic block 402 that is already joined with the operation object 401a.

Whether a block 402 can be picked up or whether a block 402 can be joined is determined based on a distance between the operation object 401 and the block 402. Picking up or joining is possible when the operation object 401 is located within a certain distance of the block 402.

This simulates the concept of a magnet. FIGS. 6A and 6B show a comparison of the concept of a magnet and the concept of the processing.

In FIG. 6A, the distance between the operation object 401 and the block 402 is less than or equal to the threshold distance D, so that the block 402 can be picked up or joined. On the other hand, in FIG. 6B, the distance between the operation object 401 and the block 402 is greater than the threshold distance D, so that the block 402 cannot be picked up or joined.

These conditions correspond to the processing execution conditions in the processing-condition setting table stored in the processing-condition storage unit 204, described earlier with reference to FIG. 3. Three-dimensional objects satisfying the processing execution a condition are distinguished from other blocks according to a processing mode specified in the processing-condition setting table, for example, by changing display mode or outputting sound, as shown in FIG. 7.

Figure 7:
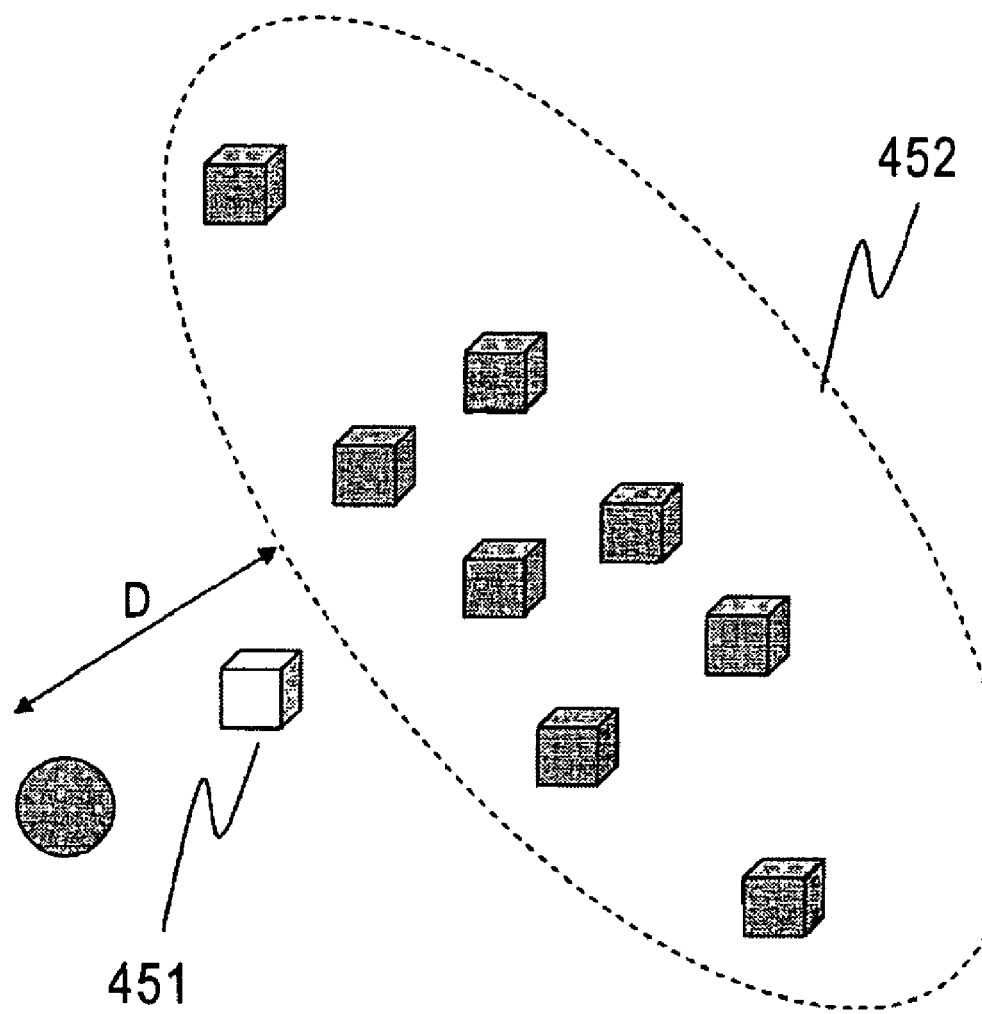
FIG. 7 is an illustration showing an example of distinction between blocks that can be picked up and blocks that cannot be picked up based on a threshold distance, and an example of displaying these blocks so as to allow distinction.

In the example shown in FIG. 7, only a block 451 that can be picked up is displayed in a mode that is different from blocks 452 that cannot be picked up. This processing is executed according to the processing mode specified in the processing-condition setting table stored in the processing-condition storage unit 204.

As described above, only blocks 402 that is within a predetermined threshold distance of the operation object 401 can be picked up. The user is allowed to readily distinguish, by the difference in display mode, which blocks are close to the operation object 401 and therefore can be picked up.

As described above, according to the embodiment, in various processing such as pickup or joining, three-dimensional objects satisfying a certain condition for executing processing are selected and reported to the user. Thus, for example, compared with conventional graphic software in which objects can be joined or picked up when the objects overlap each other in a three-dimensional space, the user is allowed to distinguish blocks 402 that are close to the operation object 401 simply by moving objects based on recognition of approximate positions. Therefore, for example, the user is allowed to pick up a block 402 by placing the operation object 401 in proximity to the block 402 instead of moving the operation object 401 precisely to the position of the block 402. This reduces stress of the user.

When a block 402 are picked up or joined, a button (switch) provided on the operating device 106a or 106b is pressed to input an instruction signal to the display-information controlling unit 101, and the display-information controlling unit 101 updates display information based on the instruction signal so that the block 402 will be picked up, i.e., the block 402 will overlap the operation object 401.

As described earlier, the user has difficulty in perception with respect to the depth direction of the display having a two-dimensional surface. Thus, it is difficult and burdensome for the user to precisely move the operation object 401 to a coordinate position (X1, Y1, Z1) of the block 402 in a three-dimensional space. Furthermore, it is also a considerable burden for the user to move the operating device 106 in the three-dimensional space so that the operation object 401 will be precisely moved in a virtual three-dimensional space on the display, since the operation requires delicate control of the movement of the operating device 106. The difficulty further increases when operating devices associated with operation objects are operated simultaneously with both hands.

In contrast, according to the embodiment, a processing execution condition having a certain acceptable range, such as a distance between objects being less than or equal to a predetermined distance, is specified, and an object can be picked up or joined when the processing execution condition is satisfied. Thus, strict precision is not required in user's operations, so that ease and efficiency of operations are improved.

According to the embodiment, when a processing execution condition is satisfied, for example, when a distance between objects is less than or equal to a predetermined threshold distance or when attitudes of operation objects satisfy a specific condition, for example, when the attitudes are parallel to each other, the user is notified, by changing display, outputting sound, or the like, that processing of objects such as pickup or joining is possible. This allows the user to distinguish processing of which objects, such as pickup or joining, is allowed, and to proceed to next operation accordingly. For example, when the user presses a button (switch) provided on the operating device, an object is picked up or joined.

Objects that can be picked up or joined, such as, objects satisfying a preset condition, such as objects having a mutual distance less than or equal to a threshold distance or objects that are parallel to an operation object, are distinguished, for example, by changing display mode. More specifically, for example, the color of blocks that can be picked up or joined are changed, such blocks are enlarged, lines connecting such blocks are shown, a balloon is shown, or sound is output, so that the type of processing possible is presented the user.

Generation of Objects (Blocks)

Figure 8:
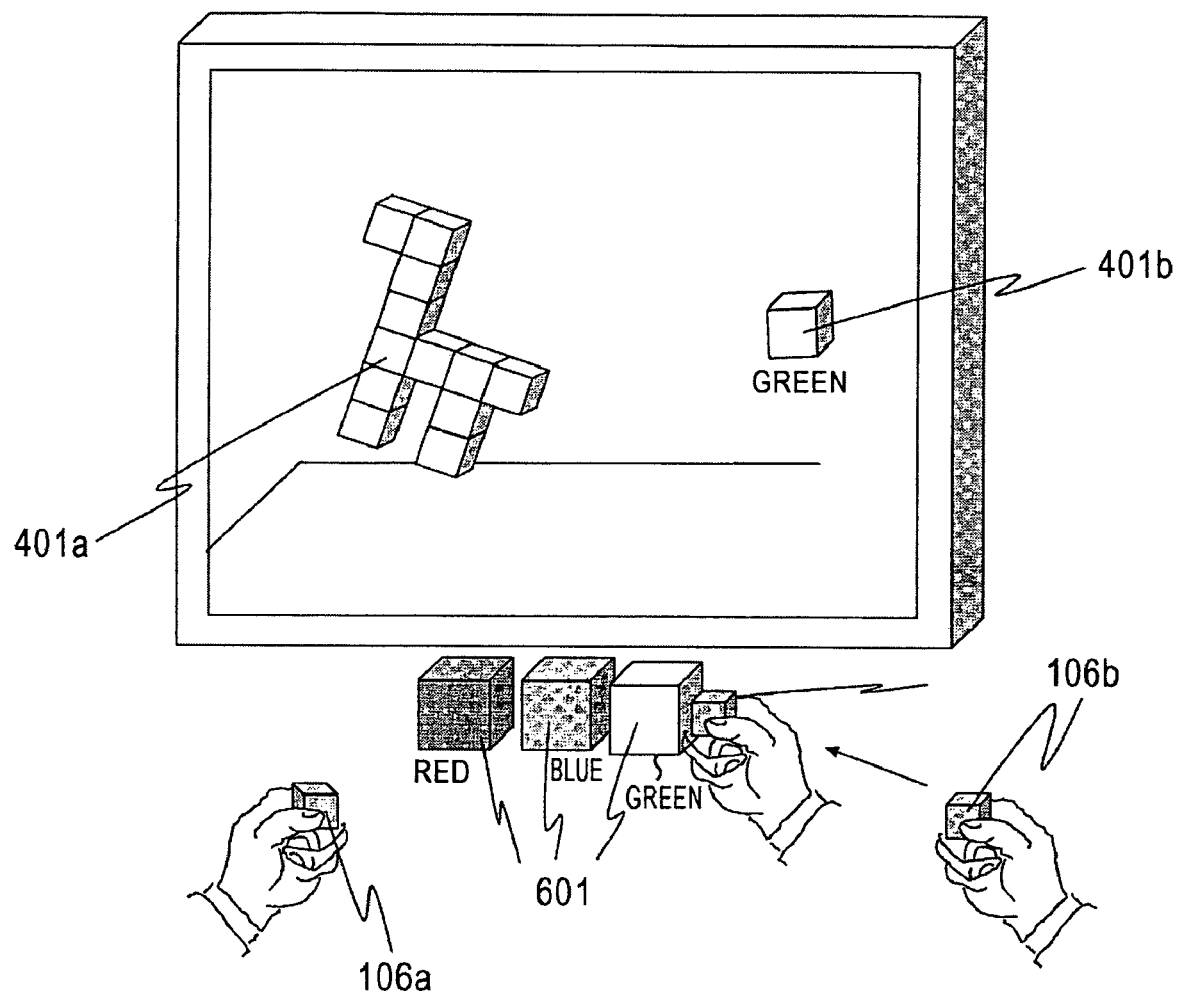
FIG. 8 is an illustration showing how a block is generated in the building-block application.

When an object, for example, a block, is newly generated on the display, a real block object is used. Referring to FIG. 8, processing for newly generating and displaying a block on the display will be described.

As shown in FIG. 8, the user places the operating device 106b in contact with or in proximity to a real block object 601, whereby a block corresponding to the real block object 601 is generated and displayed on the display as an operation object 401b.

For example, a red block, a blue block, and a green block are provided as real block objects 601, and a block having a color of a real block object 601 the operating device 106b is placed in contact with or in proximity to is displayed on the display.

Three-dimensional information of the real block objects 601 is registered in advance in the display-information controlling unit 101. When position information of the operating device 106 indicating that a real block object 601 of one of the colors is placed in contact with or in proximity to the operating device 106 is input to the display-information controlling unit 101, an operation object 401b composed of a block of a specific color is displayed on the display based on the input position information. In the example shown in FIG. 8, the operating device 106b is placed in contact with the real block object 601 of the green color, whereby an operation object 401b composed of a green block is displayed on the display.

By generating and displaying an object as described above, the user need not pick up a block left off in the three-dimensional space on the display, and is allowed to generate a block in the virtual space by a simple operation of placing the operating device 106 in contact with a real block object 601 in the real world.

The user is allowed to generate objects having various shapes by combining blocks, such as an object 401a having a shape of a giraffe, as shown in FIG. 8. Furthermore, objects composed of combinations of blocks can be transferred to a space shared with other users via a network so that the objects can be operated in various ways in that space.

Now, processing for transferring an object to a shared space will be described with reference to FIGS. 9 and 10. A shared three-dimensional space is image data of a three-dimensional space provided by a server 710, for example, three-dimensional image data of a shared three-dimensional space 730 provided by the server 710, shown in FIG. 10.

Figure 9:
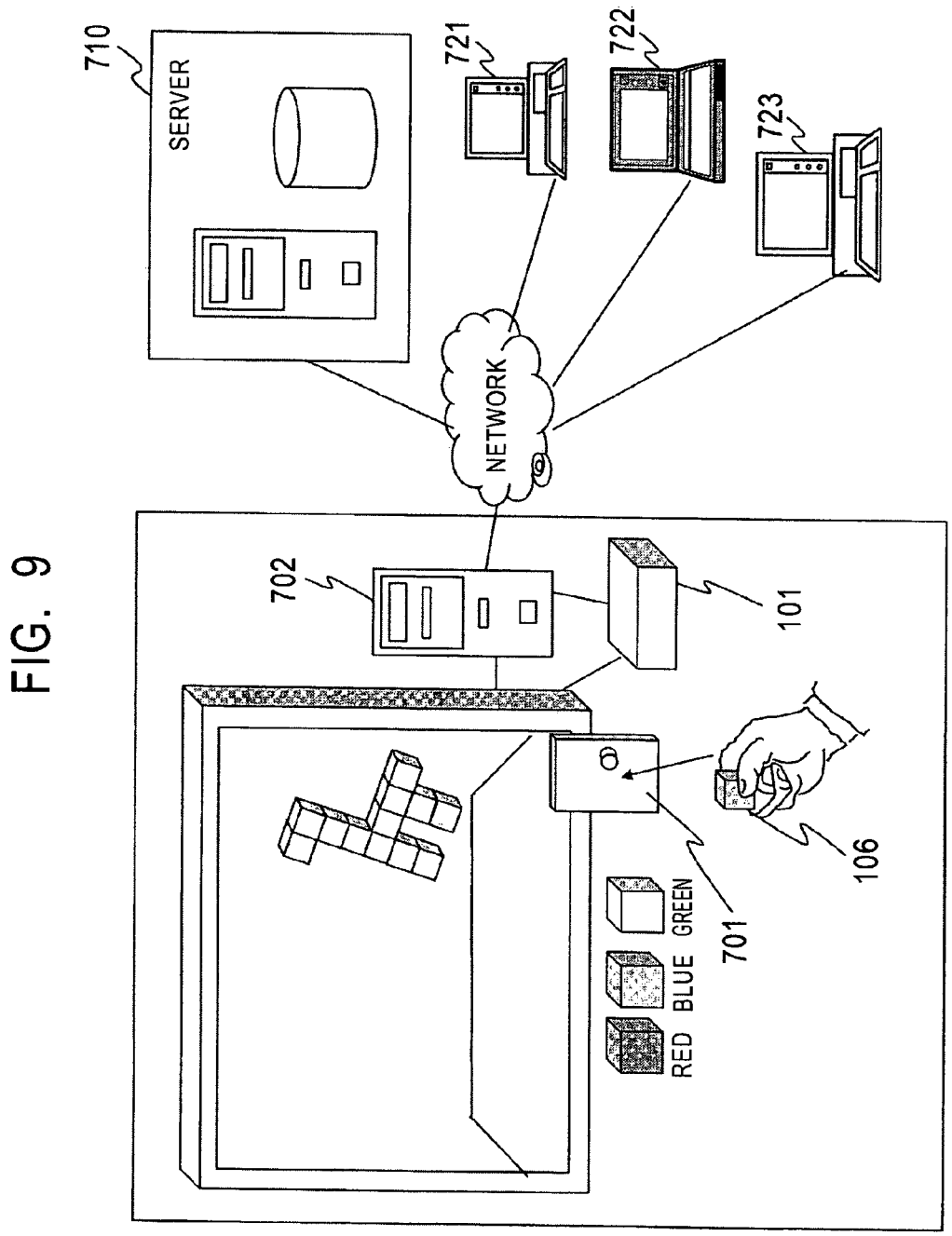
FIG. 9 is an illustration showing processing for transferring an object to a shared space based on a network connection in the building-block application.
Figure 10:
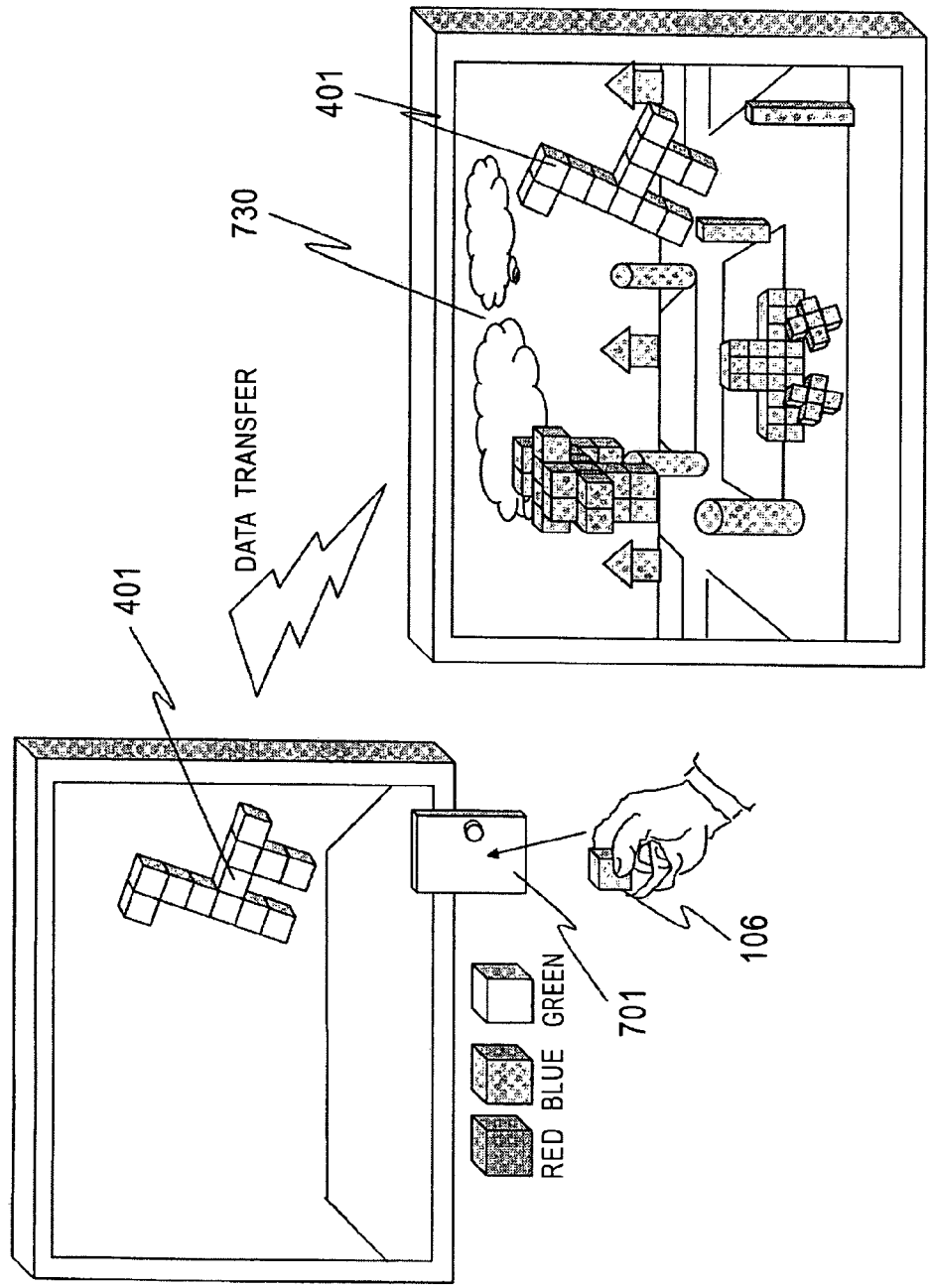
FIG. 10 is an illustration showing processing for moving an object to a shared space based on a network connection in the building-block application.

The three-dimensional image data can be obtained by various clients 721, 722, and 723 connected via a network as shown in FIG. 9, by specifying a uniform resource locator (URL) representing a location of a database of the server 710.

Referring to FIG. 9, the user operating the operating device 106 places the operating device 106 in contact with or in proximity to a real object 701 for network connection.

Three-dimensional information of the real object 701 for network connection is registered in advance in the display-information controlling unit 101. When position information of the operating device 106 indicating that the operating device 106 is placed in contact with or in proximity to the real object 701 for network connection is input to the display-information controlling unit 101, object information is sent to the server 710 via a network connection controller 702 according to address information (e.g., URL) associated with the real object 701 for network connection.

The server 710 displays an object corresponding to the object information in three-dimensional image data identified by the URL. As a result, an operation object 401 is displayed in the shared three-dimensional space 730, as shown in FIG. 10. The three-dimensional image can be displayed on displays of various client machines connected to the network. The shared three-dimensional space 730 includes objects assembled by other users, and the shared three-dimensional space 730 can be developed by a plurality of users.

As described above, in the building-block application, using operating devices operated by the user in the three-dimensional-information measuring unit 102, objects of various shapes can be assembled using the real block objects 601 and the real object 701 for network connection in combination with each other. Furthermore, the objects assembled can be shared among a plurality of users. Thus, the users are allowed to enjoy the pleasure of creation and sharing.

Furthermore, a program for changing the operation of the operation object 401 in the shared three-dimensional space 730 according to the composition of the operation object 401 may be sent from a server or a client to the server 710 so that operation based on the composition of the operation object 401 can be executed.

For example, in the case of an operation object 401 including a large number of red blocks, the operation object 401 operates according to a program with which the operation object 401 quickly moves around the shared three-dimensional space 730, as shown in FIG. 11A. In the case of an operation object 401 including a large number of blue blocks, the operation object 401 operates according to a program with which the operation object 401 jumps around the shared three-dimensional space 730, as shown in FIG. 11B. In the case of an operation object 401 including a large number of green blocks, the operation object 401 operates according to a program with which the operation object 401 rotates and moves in the shared three-dimensional space 730, as shown in FIG. 11C. As described above, it is possible to configure a display program so that the operation of the operation object 401 will change according to the composition of the operation object 401, causing an object received from a client to operate according to the composition of the object. The program defining operation may be sent to the server together with object information, or owned by the server and a specific program is selected based on object composition information received by the server via the network.

Display of the Number of Blocks

Next, an example where the number of blocks constituting an object is displayed on the display will be described with reference to FIG. 12.

Referring to FIG. 12, an operation object 401a and an operation object 401b are objects generated by operations of the user. In association with these objects, the numbers of blocks constituting the respective objects are shown in block-number display areas 751a and 751b on the display.

The block-number display area 751a shows the number of blocks constituting the operation object 401a, i.e., 12. The block-number display area 751b shows the number of blocks constituting the operation object 401b, i.e., 7. Furthermore, a total-block-number display area 750 shows the total number of blocks shown on the display, such as, 30 or the like.

When the user operates an operating device to additionally join blocks to an object, the number of blocks shown in a relevant block-number display area is increased in accordance with the number of blocks added. On the other hand, when the user operates an operating device to remove blocks from an object, the number of blocks shown in a relevant block-number display area is decreased in accordance with the number of blocks removed. These operations are executed by the display-information controlling unit 101, which stores the number of blocks constituting each object.

As described above, by displaying the number of blocks constituting each object and the total number of blocks, it is possible to facilitate learning of addition and subtraction. Since the number of blocks constituting the operation object 401 changes dynamically in accordance with blocks joined or picked up, it is possible to learn numeric calculations with pleasure.

Processing Sequence

Next, sequences of processes executed in the three-dimensional-model processing apparatus according to this embodiment will be described with reference to flowcharts.

Figure 13:
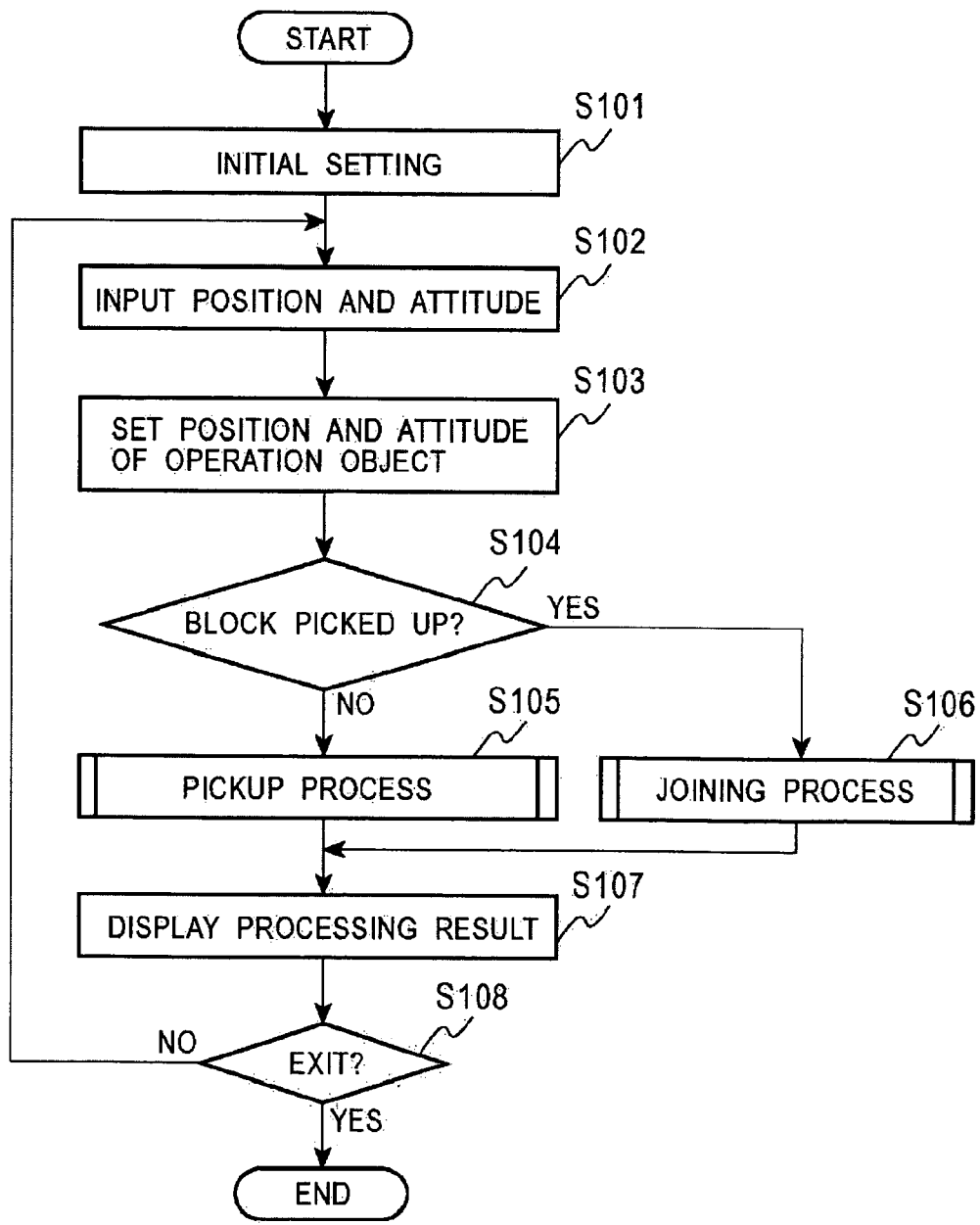
FIG. 13 is a flowchart showing the procedure of an object displaying process executed in the display-information controlling unit.

FIG. 13 is a flowchart showing the procedure of an object displaying process executed in the display information controlling unit 101. Now, the object displaying process shown in FIG. 13 will be described in order of steps.

Step S101

Various initial setting needed for the building-block application is executed. For example, a shape (sphere in the example shown in FIG. 5) and color of an operation object are read from a setting file, the number and color of blocks 402 left off in the virtual space (refer to FIG. 5) are set, and the blocks 402 are arranged on a floor of the virtual space.

Step S102

Three-dimensional information of each operating device, i.e., position and attitude information, is input from the three-dimensional-information measuring unit 102.

Step S103

Based on the three-dimensional information of each operating device, such as, position and attitude information, input in step S102, position and attitude of the operation object 401 shown on the display of the image display unit 103 are set. At this time, the position and attitude input in step S102 may be used directly as the position and attitude of the operation object 401, or an offset may be added to determine the position and attitude of the operation object 401 shown on the display.

Step S104

It is determined whether an operation block associated with an operating device operated by the user has picked up a block 402. The initial state may either be such that a block has been picked up or not picked up. When a block has not been picked up, the operation object 401 is placed in contact with or in proximity to a block 402 (refer to FIG. 5) left off in the virtual space, and then a button on the operating device is pressed, whereby the block 402 is picked up.

If it is determined in step S104 that the operation object 401 has picked up a block 402, the process proceeds to step S106. Otherwise, the process proceeds to step S105.

Step S105

A block pickup process is executed. The block pickup process will be described later in detail.

Step S106

A block joining process is executed. The block joining process will be described later in detail. When this process is completed, preferably, the completion of the process is reported by changing the color of the blocks, object, or a specific area of the display, so that the completion of the process can be readily distinguished from a case where the process is not executed (i.e., type of processing is displayed). Furthermore, when a plurality of three-dimensional objects having substantially the same shape exists, the completion of the process may be reported by changing the color of the objects after the completion of the process or by displaying the number of three-dimensional objects that have been picked up.

Step S107

The result of the pickup process in step S105 or the joining process in step S106 is displayed on the image display unit 103. When a sound relating to the result of the process is to be presented, the sound is output through the speaker.

Step S108

It is determined whether or not to exit the process. When the process is to be continued, the process returns to step S102, and the operation described above is repeated. On the other hand, when the process is not to be continued, the entire processing routine is exited in this step.

The processing routine may be exited when a user input is received via the three-dimensional-information measuring unit 102, the keys 310, or the pointing device 311, or according to a predetermined rule within the application (e.g., game over in a game). Alternatively, a hardware or software restriction may be used as a condition for exiting the process, such as a memory becoming full.

Figure 14:
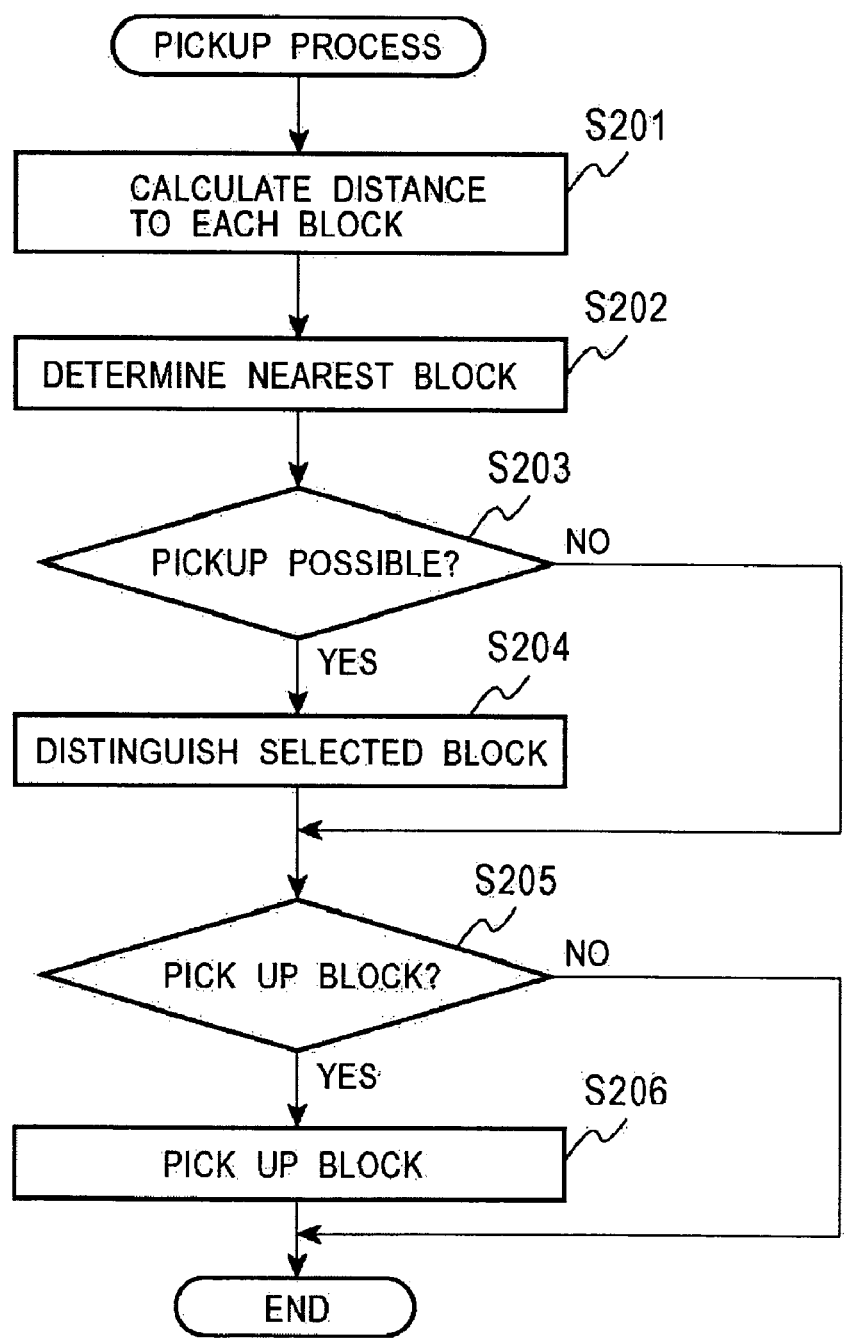
FIG. 14 is a flowchart showing the procedure of a pickup process executed by an operation of an operation object.

Next, the pickup process in step S105 will be described in detail. In the pickup process, an operation object 401 is placed in proximity to a block 402 to pick up the block 402. Now, the procedure of the pickup process will be described in order of steps with reference to a flowchart shown in FIG. 14.

Step S201

Distances between the operation object 401 and all blocks 402 displayed on the image display unit 103 is calculated. The distances are measured in the virtual three-dimensional space displayed on the image display unit 103.

In the processing for calculating distances, blocks that cannot be picked up may be disregarded. Blocks that cannot be picked up are, for example, gray blocks in part (a) of FIG. 15. White blocks are blocks that can be picked up. That is, even when the white blocks are removed by pickup, the object is maintained as a single group, as shown in part (c) of FIG. 15. On the other hand, when gray blocks are picked up, the object is divided into a plurality of groups, as shown in part (b) of FIG. 15, so that it is not possible to separate only a single block. Therefore, these blocks are not to be picked up, and may be disregarded when calculating distances.

This is because when an object is divided into a plurality of groups, as shown in part (b) of FIG. 15, even blocks not having surfaces in contact with each other are considered as a single object, which do not accord with rules of physics. However, the object need not necessarily accord with the rules of physics, and some applications may allow such shapes.

Alternatively, blocks that cannot be picked up may be specified explicitly in order not to break blocks once assembled. The specified blocks cannot be picked up, and are disregarded when calculating distances.

Step S202

Based on the distances between the operation object 401 and the blocks 402, calculated in step S201, a block 402 that is nearest to the operation object 401 is determined.

Step S203

It is determined whether the block 402 determined in step S202 can be picked up. If the block 402 can be picked up, the process proceeds to step S204. Otherwise, the process proceeds to step S205.

Whether the block 402 can be picked up is determined according to whether a processing execution condition described with reference to FIG. 3 is satisfied. However, even when a block satisfies the processing execution condition, if the block is determined in step S201 as a block that cannot be picked up, the block cannot be picked up.

The processing execution condition described with reference to FIG. 3 is, for example, that a distance d between an operation object and a block is less than or equal to a predetermined threshold distance D, or that relative attitudes of an operation object and a block satisfies a predetermined condition. For example, whether pickup is possible may be determined in consideration of the directions of the operation object 401 and the block 402. The condition may be such, for example, that if the operation object 401 has a shape of an arrow, only blocks 402 in the direction pointed by the arrow can be picked up.

In the following description, it is assumed that the processing execution condition is that a distance d between an operation object and a block is less than or equal to a predetermined threshold distance D.

Whether the selected block satisfies the processing execution condition is determined based on the distance calculated in step S201. That is, when the distance between the operation object 401 and the block 402 is less than or equal to the threshold distance D set in the initial setting in step S101 of FIG. 13, the block 402 can be picked up. On the other hand, if the distance is greater than the threshold distance D, the block 402 cannot be picked up. The spatial relationship for determining whether pickup is possible is stored in the processing-condition storage unit 204 in the form of the processing-condition setting table described earlier with reference to FIG. 3.

Furthermore, the distance at which pickup becomes possible may be determined dynamically based on the precision of measurement of three-dimensional position and attitude. For example, when an expensive three-dimensional position and attitude measuring device having a high precision is used, the threshold distance D is set to be relatively short. On the other hand, when an inexpensive three-dimensional position and attitude measuring device having a low precision is used, the threshold distance D is set to be relatively long. The precision information is stored in the three-dimensional-information measuring unit 102, and is read by the display-information controlling unit 101 in the initial setting in step S101 of FIG. 13. The threshold distance D is set based on the information read.

When the precision of the three-dimensional-information measuring unit 102 changes dynamically, the threshold distance D may be changed as needed in accordance with the confidence of values measured. An example of changing the threshold distance D in a case where an optically implemented three-dimensional position and attitude measuring device is used will be described with reference to FIGS. 16A to 16C.

The optically implemented three-dimensional-information measuring device uses a camera 1101 to image a plurality of markers 1102 on a measured object 1103 (corresponding to the operating device 106), and calculates the position and attitude of the measured object 1103 (operating device 106) based on the positions of the markers on an image 1104 captured. At this time, the image must include at least three markers, and the precision increases as the number of markers in the image increases.

Figure 16A:
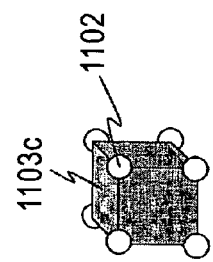
FIGS. 16A to 16C are illustrations showing difference in confidence of measurement by optically implemented three-dimensional position and attitude measuring devices.
Figure 16B:
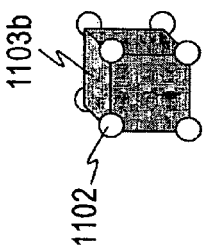
Figure 16C:
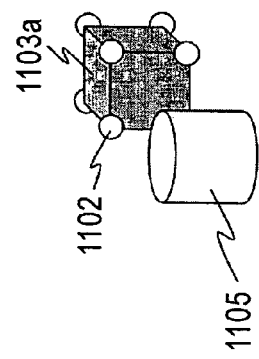

More specifically, when markers 1102 are hidden by an obstacle 1105, a hand, or the like, the number of markers in the image decreases and the precision is therefore lowered, as shown in FIG. 16A. On the other hand, when the number of markers 1102 in the image becomes larger, as shown in FIG. 16B or FIG. 16C, the precision is expected to rise.

As described above, when an optically implemented three-dimensional-information measuring device is used, confidence can be determined according to the number of markers observed in an image captured, so that a distance at which pickup becomes possible can be set dynamically based on the confidence. For example, as shown in FIG. 16A, when the number of markers in the captured image is small and the confidence is therefore determined as low, the threshold distance D is set to be relatively long. On the other hand, as shown in FIG. 16C, when the number of markers in the captured image is large and the confidence is therefore determined as high, the threshold distance D is set to be relatively short.

When a magnetically implemented three-dimensional-information measuring device is used, three-dimensional position and attitude are measured by generating a magnetic field. Thus, the precision becomes lower when a substance that affects the magnetic field, such as iron, exists in the proximity of the three-dimensional-information measuring device. Thus, the precision of a magnetically implemented measuring device is considerably dependent on the effects of the circumstances.

Thus, when a magnetically implemented three-dimensional-information measuring device is used, a user may be prompted to point a known position (e.g., the position of a real object 601 for generation of a block) on the display or in front of the display when the application is activated, so that precision will be estimated based on difference or variation of measured values and actual values, measurement precision under actual operating environment will be measured, and the threshold distance D will be set accordingly.

As described above, the processing execution condition such as the threshold distance D is determined based on precision or resolution of three-dimensional measurement in the three-dimensional-information measuring unit. The resolution refers to a minimum unit of measurement. The precision or resolution of three-dimensional measurement is reported from the three-dimensional-information measuring unit 102 to the display-information controlling unit 101 in the initial setting (step S101 in FIG. 12), and the display-information controlling unit 101 determines the processing execution condition such as the threshold distance D based on the precision or resolution. Furthermore, when the precision or resolution changes in the course of measurement, the display-information controlling unit 101 receives information representing the change from the three-dimensional-information measuring unit 102, and dynamically changes the processing execution condition such as the threshold distance D based on the information received.

Step S204

The user is notified of the block 402 that is selected in step S202 and determined in step S203 that pickup is possible. For example, the block 402 determined that pickup is possible is displayed so as to allow distinction thereof, so that which block can be picked up will be visually understood. This may be achieved by changing display mode, by outputting sound, or by various other methods, correspondingly to the processing mode specified in the processing-condition setting table described earlier with reference to FIG. 3.

Figure 17A:
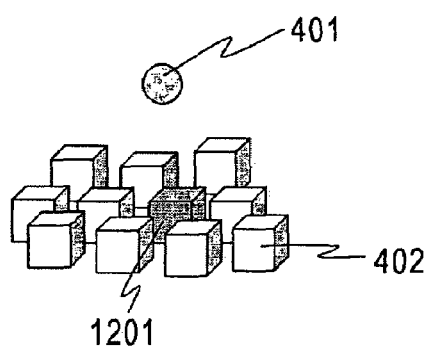
FIGS. 17A to 17D are illustrations showing examples where blocks that can be picked up are distinguished.
Figure 17B:
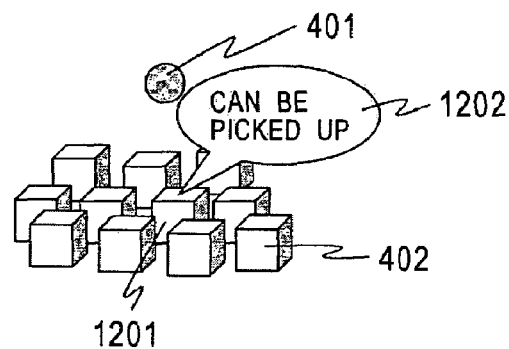
Figure 17C:
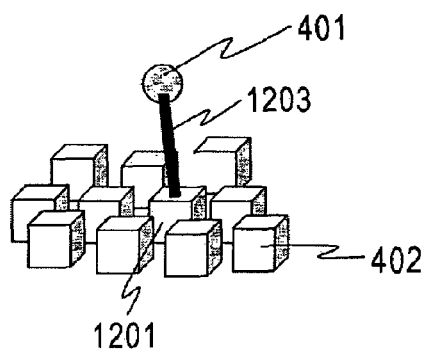
Figure 17D:
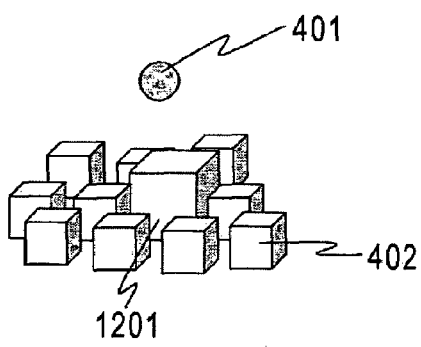

FIGS. 17A to 17D show examples of processing for allowing distinction of blocks that can be picked up. In FIG. 17A, a block 1201 that can be picked up is displayed in a color different from that of other blocks. In FIG. 17B, a block 1201 that can be picked up is distinguished by a balloon 1202 shown above the block 1202. In FIG. 17C, a block 1201 that can be picked up is distinguished by a guide 1203 extending from the operation object 401 to the block 1201. In FIG. 17D, a block 1201 that can be picked up is shown in a larger size. Alternatively, a block 1201 that can be picked up may be distinguished by animation effect.

Furthermore, a block 1201 that can be picked up may be distinguished by sound effect. For example, in the case of blocks representing animals such as dogs or cats, a block 1201 that can be picked up may be distinguished by a voice of the animal.

As described above, a block that can be picked up is explicitly distinguished by color, balloon, guide, shape, animation, sound, or combination of these factors.

Step S205

It is determined whether a block 402 is to be picked up. When no block 402 that can be picked up exists after step S204, or when a pickup instruction is not issued, the process is exited. When a pickup instruction is issued and a block 402 that can be picked up exists, the process proceeds to step S206.

A pickup instruction can be issued, for example, by pressing a button on the operating device 106. Alternatively, the display-information controlling unit 101 may assume input of a pickup instruction when the operating device 106 is moved so that an operating object on the display is drawn nearer to an object that can be picked up.

Step S206

A block 402 that can be picked up is actually picked up. A pickup refers to an operation of moving the block 402 to the position of the operation object 401 and integrating the block 402 with the operation object 401, and then maintaining the relative positions of the block 402 and the operation object 401. That is, when the operation object 401 is moved, the block 402 is simultaneously moved.

The object pickup process is executed according to the flow described above. As described above, according to this embodiment, in a virtual three-dimensional space shown on a display, a block 402 that can be picked up is presented so as to allow distinction by a user without setting the block 402 at the same position as the operation object 401. When a pickup instruction is issued by user input, the block 402 is picked up. Thus, even when the precision of measurement by the three-dimensional-information measuring unit 102 is low, the user is allowed to perform pickup operations without stress.

Figure 18:
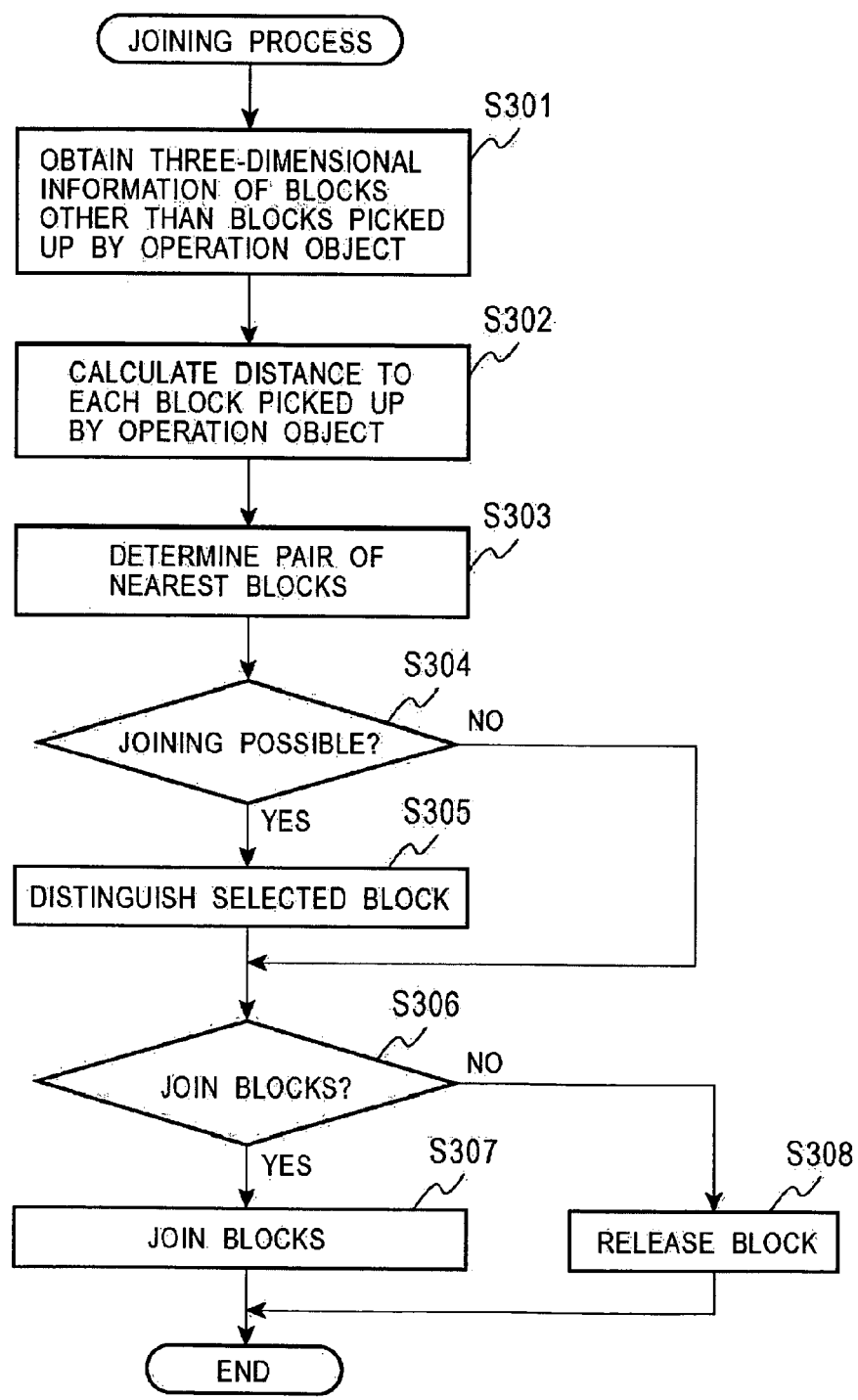
FIG. 18 is a flowchart showing the procedure of a block joining process executed according to an operation of an operation object.

Next, the joining process in step S106 of FIG. 13 will be described in detail. The joining process refers to a process in which an operation object 401 releases a block 402 it has picked up and joins the block 402 with another operation object that exists in the proximity thereof. The joining process will be described in order of steps with reference to a flowchart shown in FIG. 18.

Step S301

Three-dimensional information of blocks other than blocks picked up by a subject operation object is obtained. When joining with blocks other than the blocks 402 picked up by the operation object 401 is allowed, for example, joining with blocks 402 left on the floor or on the wall, three-dimensional information of all the blocks with which joining is possible is obtained.

Step S302

Distances between the blocks 402 of which three-dimensional information is obtained in step S301 and all the blocks 402 picked up by the subject operation object 401 are calculated. At this time, blocks 402 that cannot be picked up may be disregarded. Blocks that cannot be picked up are, for example, blocks whose joining surfaces are already joined with other blocks. Each surface of a block can only be joined with a singe block.

Figure 19A:
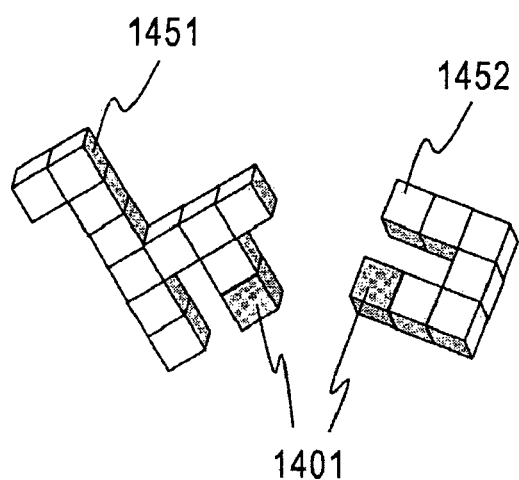
FIGS. 19A and 19B are illustrations showing an example where blocks cannot be joined.
Figure 19B:
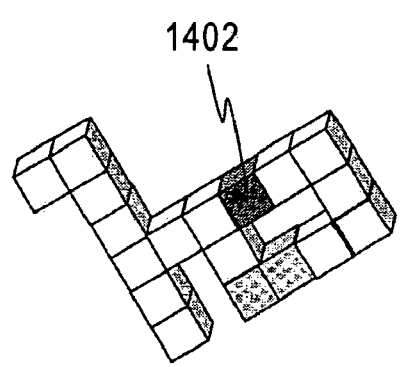

When a plurality of blocks is joined with each other, for example, a final state after joining may be assumed to determine that joining is not possible when some blocks overlap each other in the final state. FIGS. 19A and 19B show an example where some blocks overlap each other after joining. When an object 1451 and an object 1452 are joined to form a combined block 1401 as shown in FIG. 19A, an overlapping block 1402 occurs between the objects 1451 and 1452.

When such an overlapping block occurs, it is determined that joining is not possible. Whether joining is to be allowed in such cases can be chosen, and joining may be allowed even in cases where an overlapping block occurs.

Step S303

A pair of nearest blocks 402 is searched for based on the distances of the blocks, calculated in step S302.

Step S304

It is determined whether the pair of blocks 402 determined in step S303 can be joined with each other. If the blocks 402 can be joined, the process proceeds to step S305. Otherwise, the process proceeds to step S306.

Whether the blocks 402 can be joined is determined based on the distance between the two blocks 402, similarly to determining whether blocks can be picked up in the pickup process. When the distance between the blocks 402 is less than or equal to the threshold distance D set in the initial setting in step S101 of FIG. 13, joining is possible, and otherwise joining is not possible. The condition for determining whether joining is possible is specified in the processing-condition setting table stored in the processing-condition storage unit 204, described earlier with reference to FIG. 3.

The threshold distance D may be determined dynamically based on the precision of measurement by the three-dimensional-information measuring unit, similarly to the determination as to whether pickup is possible.

Furthermore, similarly to the determination in step S302 as to whether joining is possible, when a block is already joined with a surface that is to be used for joining, it is determined that a block cannot be joined even if the block is within the threshold distance D. However, it is determined that joining is possible when an overlapping block is permitted.

Step S305

Processing for allowing distinction of the block 402 selected in step S303 and determined in step S304 that joining is possible is executed. For example, the block 402 is highlighted so that which block can be joined will be understood visually.

Figure 20A:
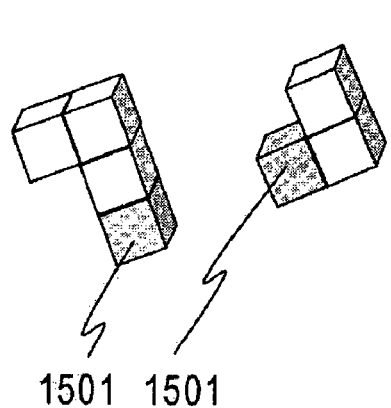
FIGS. 20A to 20C are illustrations showing an example where blocks that can be joined are distinguished.
Figure 20B:
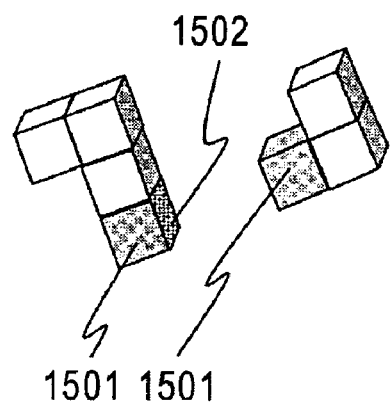
Figure 20C:
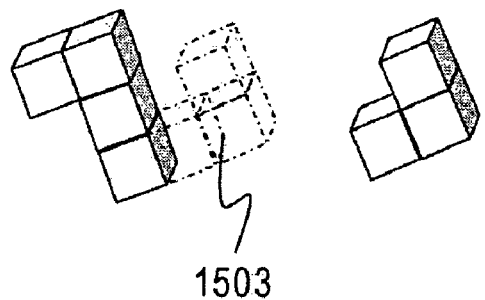

FIGS. 20A to 20C show examples of display of blocks 402 selected as blocks that can be joined. In FIG. 20A, blocks that can be joined are displayed in a color different from that of the other blocks. In FIG. 20B, blocks to be joined and surfaces thereof are shown with a joining surface 1502 for joining the blocks with each other displayed in a different color or pattern. In FIG. 20C, a virtual joining region 1503 after joining is shown. As described above, preferably, the virtual joining region 1503 after joining or the joining surface 1502 is displayed when attitudes as well as positions of blocks are restricted.

As shown in part (c) in FIG. 15, by displaying an object having the same shape as the operation object 401 as the virtual joining region 1503 showing a state after joining, an effect different from that of the conventional grid-based positional restriction can be expected. That is, as opposed to grid-based positional restriction, with which an operation object 401 itself is moved and the operation object 401 is displayed as flying between grids, according to this embodiment, an operation object 401 is moved smoothly in the three-dimensional space while allowing the user to check the virtual shape 1503 having the same shape as the operation object 401. Thus, more natural control is achieved.

Alternatively, blocks that can be joined may be distinguished by shape such as size, animation, sound, or combination of these factors, similarly to the pickup process.

Step S306

It is determined whether a block 402 is to be joined. When a candidate block 402 that is to be joined does not exist after step S305, or when a joining instruction is not issued by the user, the process proceeds to step S308. When a joining instruction is issued and a block 402 that can be joined exists, the process proceeds to step S307.

A joining instruction can be issued, for example, by pressing a button on the operating device 106, or by shaking the operating device 106. The display-information controlling unit 101 determines whether a joining instruction is issued based on whether such instruction information is received.

Step S307

A block 402 that can be joined is actually joined. At this time, if a plurality of blocks has been picked up, groups of blocks are joined with each other.

Step S308

A block that has been picked up is released. That is, a block that is integrated with an operation object on the display, associated with an operating device, is detached from the operation object. In this processing, animation simulating a block falling by the gravity may be shown, or the block may be shown as floating.

When the processing in step S307 or S308 is completed, preferably, the completion of the processing is reported by outputting sound, or changing the color of a block, an object, or a specific region of the display. This is done to distinguish the completion of the processing from a case where the processing is not executed. Furthermore, when a plurality of three-dimensional objects having substantially the same shape exists, the completion of the processing may be reported by changing the color of objects after the completion of the processing or displaying the number of three-dimensional objects that have been picked up.

Objects or blocks constituting objects are joined according to the flow described above. As described above, according to the embodiment, a block 402 that can be joined when a certain condition is satisfied is presented to the user so as to allow distinction thereof without setting the operation object 401 at or in contact with the same position as an object to be joined in the virtual three-dimensional space on the display. When a joining instruction is issued by user input, objects or blocks are joined with each other. Thus, even when the precision of measurement by the three-dimensional-information measuring unit 102 is low, the user is allowed to perform joining operations without stress.

In the embodiment described above, cubic blocks are used as three-dimensional objects. However, three-dimensional objects having other shapes, such as rectangular parallelepiped, tetrahedron, or sphere, may be used. For example, if three-dimensional models are represented by polygons, objects that can be picked up or objects that can be joined may be distinguished by highlighting relevant polygons, edges, or vertexes.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A three-dimensional-model processing apparatus for displaying three-dimensional objects on a display and for executing processing relating to the displayed objects based on information input from input means, the three-dimensional-model processing apparatus comprising:

a three-dimensional information measuring unit for measuring three-dimensional information of operating devices wherein the three-dimensional information measuring unit comprises at least one real block object, each of the at least one real block objects represents a distinct physical property;

a display-information controlling unit for controlling display of three-dimensional objects associated with the operating devices, based on the three-dimensional information of the operating devices and input from the three-dimensional-information measuring unit; and an image display unit for displaying an image including the three-dimensional objects associated with the operating devices, under control of the display-information controlling unit wherein one of the plurality of three-dimensional objects is generated on the image display unit when one of the plurality of operating devices is placed in contact with or in proximity to one of the plurality of real block object; wherein the one of the plurality of three-dimensional objects display the distinct physical property of the one of the plurality of real block objects;

wherein the display-information controlling unit determines whether relative positions or relative attitudes of a plurality of three-dimensional objects satisfy a predetermined processing execution condition, and executes processing for presenting distinction information to indicate that processing can be executed when it is determined that the processing execution condition is satisfied, and wherein the processing execution condition is a condition for executing processing for picking up or joining an object, and wherein the display-information controlling unit determines whether relative positions or relative attitudes of a plurality of three-dimensional objects displayed on the image display unit satisfy a predetermined condition for executing the processing for pickup or joining, and executes the processing for presenting distinction information to indicate that the processing for pickup or joining can be executed when it is determined that the condition for executing the processing for pickup or joining is satisfied; wherein the display-information controlling unit dynamically changes the processing execution condition based on precision or resolution of measurement of three-dimensional information in the three-dimensional-information measuring unit.

2. The three-dimensional-model processing apparatus according to claim 1, wherein the processing execution condition is a condition that is set based on a three-dimensional distance, in a virtual space, between the plurality of three-dimensional objects displayed on the image display unit.

3. The three-dimensional-model processing apparatus according to claim 1, wherein the processing execution condition is a condition that is set based on relative tilts defining attitudes of the plurality of three-dimensional objects displayed on the image display unit.

4. The three-dimensional-model processing apparatus according to claim 1, wherein the display-information controlling unit, as the processing for presenting distinction information, executes processing for changing display mode so that a three-dimensional object satisfying the processing execution condition or a three-dimensional object integrated with a three-dimensional object satisfying the processing execution condition can be distinguished from other objects.

5. The three-dimensional-model processing apparatus according to claim 4, wherein the processing for changing display mode changes at least one attribute among color, size, shape, and motion, of at least one element among surface, line, and vertex of the three-dimensional object.

6. The three-dimensional-model processing apparatus according to claim 1, wherein the display-information controlling unit, as the processing for presenting distinction information, executes processing for outputting sound so that a three-dimensional object satisfying the processing execution condition or a three-dimensional object integrated with a three-dimensional object satisfying the processing execution condition can be distinguished from other objects.

7. The three-dimensional-model processing apparatus according to claim 1, wherein the display-information controlling unit, as the processing for presenting distinction information to indicate that the processing for joining objects can be executed, executes processing for displaying a virtual joining region showing a state after joining.

8. The three-dimensional-model processing apparatus according to claim 1, wherein the display-information controlling unit generates a new object and displays the new object on the image display unit based on input information indicating that one of the operating devices is located in proximity to a position of a real object, the position being set in the three-dimensional-information measuring unit.

9. The three-dimensional-model processing apparatus according to claim 1, wherein, based on input information indicating that one of the operating devices is located in proximity to a position of a real object for network connection, the position being set in the three-dimensional-information measuring unit, processing for communication is executed to send information of an object displayed on the image display unit, the object being associated with the one operating device, to an external apparatus connected via a network, and to display the object in a three-dimensional image provided by the external apparatus.

10. The three-dimensional-model processing apparatus according to claim 9, wherein processing for communication is executed to send a program or program-specifying information defining operation of the object associated with the one operating device together with the object information to the external apparatus connected via the network, the operation being set in accordance with composition information of the object, and to display the object in the three-dimensional image provided by the external apparatus so that the object operates in accordance with the composition information of the object.

11. A three-dimensional-model processing method for displaying three-dimensional objects on a display and for executing processing relating to the displayed objects based on information input from input means, the three-dimensional-model processing method comprising:
  measuring step of measuring three-dimensional information of operating devices wherein the measuring step includes measuring at least one real block, each of the at least one real block objects represents a distinct physical property;
  controlling display-information on an image display unit, of three-dimensional objects associated with the operating devices, based on the three-dimensional information of the operating devices, measured in the three-dimensional-information measuring step; and
  displaying, on the image display unit, an image including the three-dimensional objects associated with the operating devices, under control in the display-information controlling step wherein one of the plurality of three-dimensional objects is generated on the image display unit when one of the plurality of operating devices is placed in contact with or in proximity to one of the plurality of real block objects; wherein the one of the plurality of three-dimensional objects displays the distinct physical property of the one of the plurality of real block objects;
  wherein controlling display-information comprises determining whether relative positions or relative attitudes of a plurality of three-dimensional objects satisfy a predetermined processing execution condition, and executing processing for presenting distinction information to indicate that processing can be executed when it is determined that the processing execution condition is satisfied, wherein the processing execution condition is a condition for executing processing for picking up or joining an object, and wherein controlling display-information comprises determining whether relative positions or relative attitudes of a plurality of three-dimensional objects displayed on the image display unit satisfy a predetermined condition for executing the processing for pickup or joining, and executing the processing for presenting distinction information to indicate that the processing for pickup or joining can be executed when it is determined that the condition for executing the processing for pickup or joining is satisfied; wherein controlling display-information comprises dynamically changing the processing execution condition based on precision or resolution of measurement of three-dimensional information in the three-dimensional-information measuring step.

12. The three-dimensional-model processing method according to claim 11, wherein the processing execution condition is a condition that is set based on a three-dimensional distance, in a virtual space, between the plurality of three-dimensional objects displayed on the image display unit.

13. The three-dimensional-model processing method according to claim 11, wherein the processing execution condition is a condition that is set based on relative tilts defining attitudes of the plurality of three-dimensional objects displayed on the image display unit.

14. The three-dimensional-model processing method according to claim 11, wherein controlling display-information comprises, as the processing for presenting distinction information, executing processing for changing display mode so that a three-dimensional object satisfying the processing execution condition or a three-dimensional object integrated with a three-dimensional object satisfying the processing execution condition can be distinguished from other objects.

15. The three-dimensional-model processing method according to claim 14, wherein the processing for changing display mode changes at least one attribute among color, size, shape, and motion, of at least one element among surface, line, and vertex of the three-dimensional objects.

16. The three-dimensional-model processing method according to claim 11, wherein controlling display-information comprises, as the processing for presenting distinction information, a step of executing processing for outputting sound so that a three-dimensional object satisfying the processing execution condition or a three-dimensional object integrated with a three-dimensional object satisfying the processing execution condition can be distinguished from other objects.

17. The three-dimensional-model processing method according to claim 11, wherein controlling display-information comprises, as the processing for presenting distinction information to indicate that the processing for joining objects can be executed, a step of executing processing for displaying a virtual joining region showing a state after joining.

18. The three-dimensional-model processing method according to claim 11, wherein the controlling display-information comprises generating a new object and displaying the new object on the image display unit based on input information indicating that one of the operating devices is located in proximity to a position of a real object, the position being set in the three-dimensional-information measuring unit.

19. The three-dimensional-model processing method according to claim 11, wherein, based on input information indicating that one of the operating devices is located in proximity to a position of a real object for network connection, the position being set in the three-dimensional-information measuring unit, processing for communication is executed to send information of an object displayed on the image display unit, the object being associated with the one operating device, to an external apparatus connected via a network, and to display the object in a three-dimensional image provided by the external apparatus.

20. The three-dimensional-model processing method according to claim 19, wherein processing for communication is executed to send a program or program-specifying information defining operation of the object associated with the one operating device together with the object information to the external apparatus connected via the network, the operation being set in accordance with composition information of the object, and to display the object in the three-dimensional image provided by the external apparatus so that the object operates in accordance with the composition information of the object.

21. The three-dimensional-model processing apparatus according to claim 1, wherein the three-dimensional information measuring unit comprises a three-dimensional information calculator and a magnetic-field generator.

* * * * *